(12) United States Patent
Gokcebay et al.

(10) Patent No.: US 6,374,653 B1
(45) Date of Patent: *Apr. 23, 2002

(54) MECHANICAL/ELECTRONIC LOCK AND KEY THEREFOR

(75) Inventors: Asil T. Gokcebay, Petaluma; Yucel K. Keskin, Santa Clara, both of CA (US)

(73) Assignee: Security People, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,514

(22) Filed: Dec. 14, 1999

Related U.S. Application Data

(63) Continuation-in-part of application No. 08/995,684, filed on Dec. 22, 1997, now Pat. No. 6,000,609.

(51) Int. Cl.$^7$ .............................................. E05B 49/00
(52) U.S. Cl. ........................ 70/278.3; 70/277; 70/283; 70/224; 340/825.31
(58) Field of Search ............ 70/224, 277, 278.1–278.3, 70/279–283; 292/357, 356; 340/825.31, 825.32, 542, 543; 235/182

(56) References Cited

U.S. PATENT DOCUMENTS

| | | | | |
|---|---|---|---|---|
| 4,901,545 A | * | 2/1990 | Bacon et al. ............... 70/278.3 |
| 5,337,588 A | * | 8/1994 | Chhatwal ................... 70/278.3 |
| 5,367,295 A | * | 11/1994 | Gokecebay et al. ... 340/825.31 |
| 5,373,718 A | * | 12/1994 | Schwerdt et al. .......... 70/278.3 |
| 5,437,174 A | * | 8/1995 | Aydin ........................ 70/278.3 |
| 5,552,777 A | * | 9/1996 | Gokcebay et al. ........ 70/278 X |
| 5,628,217 A | * | 5/1997 | Herrera ........................ 70/279 |
| 5,671,621 A | * | 9/1997 | Watanuki et al. ........... 70/278.3 |
| 5,685,182 A | * | 11/1997 | Chhatwal ............... 70/278.3 X |
| 5,735,152 A | * | 4/1998 | Dietz et al. ................. 70/278.3 |
| 5,742,236 A | * | 4/1998 | Cremers et al. ........... 70/278.3 |
| 5,782,118 A | * | 7/1998 | Chamberlain et al. ..... 70/278.3 |
| 5,791,178 A | * | 8/1998 | Chamberlain et al. ..... 70/278.3 |
| 5,823,028 A | * | 10/1998 | Mizuno et al. ............. 70/278.3 |
| 5,946,956 A | * | 9/1999 | Hotzl ..................... 70/278.3 X |
| 6,000,609 A | * | 12/1999 | Gokcebay et al. ........ 70/277 X |

* cited by examiner

*Primary Examiner*—Suzanne Dino Barrett
(74) *Attorney, Agent, or Firm*—Thomas M. Freiburger

(57) ABSTRACT

A lock cylinder of standard size and configuration, interchangeable with conventional mechanical cylinders, includes electronic access control features as additional security or in some embodiments as the sole security feature. A microcontroller, memory, solenoid, battery, one wire bus connection and other electric and electronic elements are self contained within the cylinder, being positioned in the cylinder shell or the cylinder plug. The microprocessor can be programmed as to authorized users, entry times, etc. using a special programming key, which itself is programmed with a computer. User keys have a memory cell or ID chip which is read by the cylinder's microcontroller on insertion of the key; however, a system of locks can include locks which are mechanical/electronic, solely electronic and solely mechanical, and keys can also be electronic, mechanical or both. In one embodiment a cylinder collar contains batteries for supplying power to the cylinder, and may also have an LED and contacts for supplying emergency power.

26 Claims, 26 Drawing Sheets

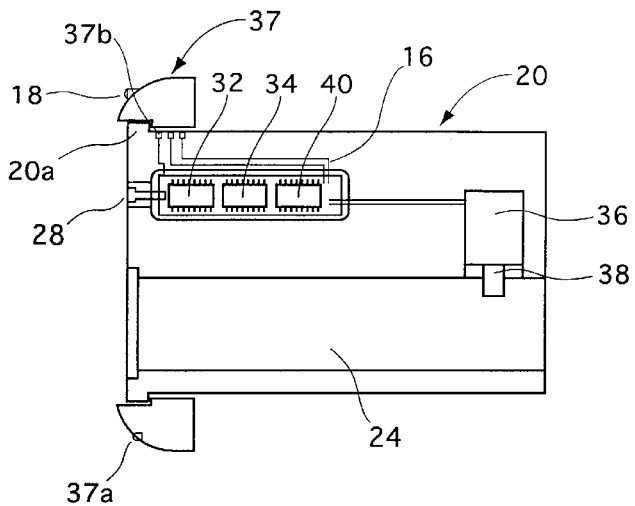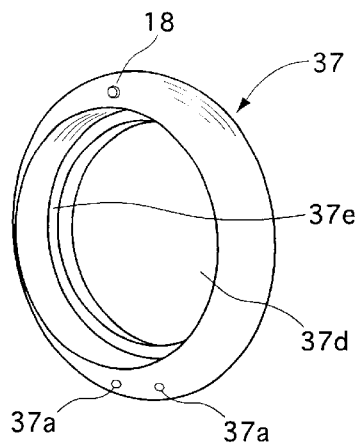
FIG.5  FIG.5A
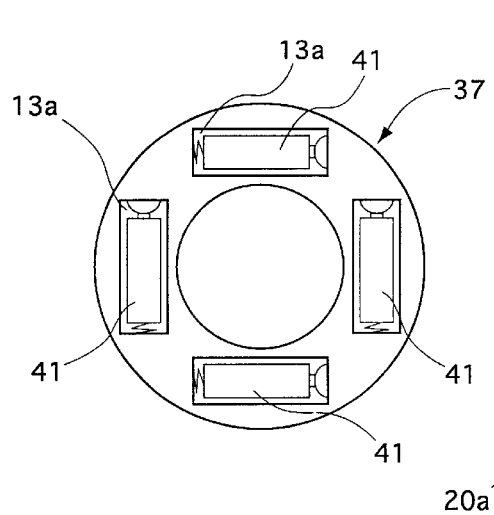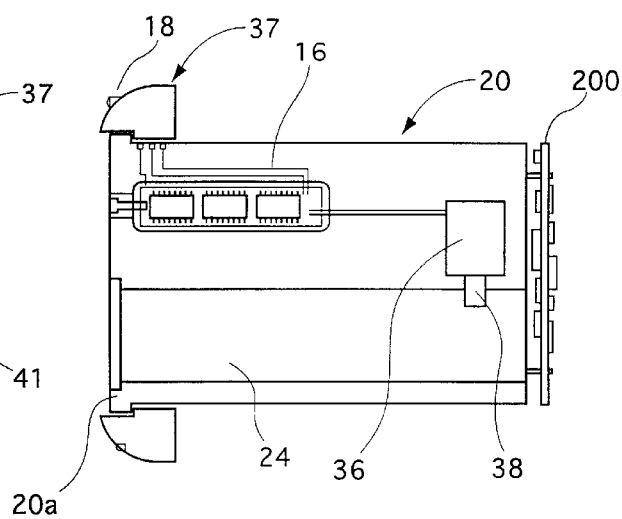
FIG.5B  FIG.5C

FIG.13

MECHANICAL/ELECTRONIC LOCK AND KEY THEREFOR

This application is a continuation-in-part of application Ser. No. 08/995,684, filed Dec. 22, 1997 and now U.S. Pat. No. 6,000,609.

BACKGROUND OF THE INVENTION

This invention is in the field of security and access control, and the invention particularly concerns access to door locks and other situations wherein numerous mechanical keys fit a single or a group of locks and wherein there is a need to control the instances of opening each lock and in some situations to maintain a record thereof.

In the past, a number of electronic security features have been added to mechanical locks which use mechanical types of cylinders. In addition, locking elements controlled by electronic means have been disclosed in combination with non-mechanical types of tumblers, such as in Clarkson et al. U.S. Pat. No. 4,712,398. In some cases electronic elements have been added to mechanical elements requiring both mechanical and electronic elements to be present before granting access such as Spahn et al. U.S. Pat. No. 5,469,727. Some of the existing electronic systems have employed keypads, some have employed cards, some have had purely electronic, magnetic or optical access control devices, and some have employed mechanical keys equipped with electronic circuitry.

With respect to the present invention, distinction is made among purely electronic, magnetic or optical keys; mechanical keys equipped with electronic, magnetic or optical features; and mechanical keys which operate solely by mechanical bittings, whether those bittings be pin tumbler, dimples or other mechanical patterns.

A key comprised of purely electronic circuitry, magnetic or optical data storage for determining and granting access is an electronic key. In the use of such a key, the circuitry or recorded data is transferred to a reader associated with a lock, and the reader recognizes a pattern or code held by the key. The key does not carry any mechanical cut or bitting configuration needed for granting access even though the key holding the data or the pattern may be used for turning the lock. Keys of this type can be found in U.S. Pat. Nos. 3,797,936 (Dimitriadis), 4,209,782 (Donath et al.), 4,257,030 (Bruhin et al.), 4,620,088 (Flies), 4,659,915 (Flies) and 4,789,859 (Clarkson et al.).

Keys referred to as mechanical keys are those which activate a mechanical device, with a pattern of mechanical bittings, by direct contact with the interpreting device, i.e. the tumblers or other pattern-holding apparatus contained in the lock. In a typical pin tumbler lock, access is granted based on the depth and configuration of key cuts meeting the tumblers. In most cases, once proper alignment is established in the tumblers, the keyholder is able to turn the key to lock and unlock the locking device. However, in some cases of mechanical keys, a push or pull action may be necessary for locking and unlocking of the device. The tumblers mentioned above can be pin tumblers, lever tumblers, disk tumblers, rotary disk tumblers, slider tumblers, or combinations of several of these incorporated within the same lock. Examples of purely mechanical keys are found in U.S. Pat. Nos. 480,299 (Voight), 550,111 (Sargent), 564,029 (Sargent), 3,208,248 (Tornoe), 4,723,427 (Oliver), 4,732,022 (Oliver) and 4,823,575 (Florian et al.).

Examples of mechanical keys equipped with electronic circuitry, magnetic or optical data storage or optical recognizable features ("mechanical/electronic keys') can be found in U.S. Pat. Nos. 3,733,862 (Killmeyer), 4,144,523 (Kaplit), 4,326,124 (Faude), 4,562,712 (Wolter), 4,663,952 (Gelhard), 4,686,358 (Seckinger et al.), 5,245,329 (Gokcebay), 5,367,295 (Gokcebay et al.) and 5,140,317 (Hyatt, Jr. et al.). Such keys carry the secondary element, whether it comprises electronic circuitry or some other type of coded data or recognizable pattern, in addition to the key's mechanically operating pattern or bitting. In some instances both mechanical and non-mechanical features of a key are used simultaneously.

A lock cylinder is the control mechanism which grants access to the lock. A mechanical lock cylinder is the control mechanism which grants or denies access to the lock based on the mechanical key being used. The mechanical configuration, i.e. the cuts on the key, has to match to the meeting mechanical configuration i.e. the tumblers of the cylinder before the key will turn in the cylinder and this turning motion will engage the latch or bolt mechanism of the lock via a cylinder cam or tail piece causing the locking or unlocking of the lock. The cylinder mechanism of the lock is generally a separate module which can be easily removed and replaced. In certain types of locks the physical characteristics of the cylinders and their receiving cavity is standardized so one brand cylinder will fit or replace another brand of cylinder. Mortise, locks using mortise (regular or removable core) or profile cylinders (eurocylinder) and rim locks using rim cylinders are good examples. The cylinder size and shape differ on bored door locks such as knob or lever locks, and deadbolt locks. Thus, one can separate the mechanical lock cylinders into two categories, those that are standard in size and shape, and those that are brand specific. With the standard cylinders one brand cylinder will replace another instantly without any modification to the lock, door or the cylinder.

There are several cylinder manufactures who specializes in making replacement cylinders which fit in other brands of locks. In some cases these are specialized high security cylinders increasing the security of the lock by offering sophisticated locking principles and key control. Also several lock manufacturers have recently started to manufacture non standard (brand specific) cylinders that fit to their competitors' locks. This is generally a marketing issue wherein by making cylinders that fit into the competitors' locks and setting up key systems using their own keyway (grooving and slotting of the key and receiving plug, they lure the customer to buy their locks for future needs. Since in order for the new locks to fit in to the keying system they need to be the same keyway, the customer opts to buy their brand of lock for future use.

It has been desirable to add electronic security and access control features to mechanical locks since, for one thing, it is not possible to regulate the date, day and time of access using purely mechanical keys and meeting tumblers. Changing the combination of a lock when a key is compromised usually requires tumblers to be changed and all of the operating keys to be replaced which is costly. Also the number of unique combinations or permutations that can be achieved using purely mechanical keys and meeting tumblers is relatively low, and further security is often needed.

Many examples of purely electronic and electronic and mechanical combinations of control elements exist in the above referenced patents. Only a few of these inventions teach an instant replacement of the cylinder unit to fit to existing locks without further modification to the lock or the door. In most cases the cylinder unit acting as an electronic reader, having additional parts or components that are connected by wires to other parts of the lock or the door, requires modification of the door and/or the lock. These components generally are circuit boards containing decision-making electronics, batteries and electrically operated locking elements such as solenoids and motors. Providing a cylinder having electronic features that offers instant replacement to fit existing locks that work with a standard type of mechanical cylinders is desirable since there are millions of existing locks that can be easily retrofitted with the cylinders of these products. The prior art does not disclose a self contained cylinder wherein the cylinder is operated by a mechanical key with electronic features and electronic or electronic plus mechanical features of the key are relied on for access. These disclosed prior devices are operated by purely electronic keys (at times shaped like a conventional mechanical key) and do not offer mechanical key configuration on the key as an additional criteria for access or to be used on other mechanical only cylinders. Relying on the mechanical configuration of the key in addition to the electronic criteria is desirable because this offers additional security. Relying on the electronic criteria only of the key is sometimes also desirable as it provides flexibility.

In a facility not all doors may require access control i.e. regulating time and day of the entry. These doors may be operated by only the mechanical criteria of the key, not relying on the electronic criteria. It is also desirable because as mentioned above, installation of the electromechanical cylinders brings in sales of mechanical-only locks using the same keyway configuration used in the electromechanical cylinder.

Of those patents disclosing standard replacement cylinder units, Clarkson et al. U.S. Pat. No. 4,712,398 shows a cylinder operated by entirely electronic criteria. The key "which closely resembles a traditional mechanical key without the usual bittings" contains electronic circuitry or memory in the key blade, which when inserted into the receiving cylinder, operates the cylinder if the data contained in the key matches the data stored in the receiving cylinder, by actuation of an electrically operated locking mechanism in the cylinder. Although there is one pin inside the cylinder and a single cut in the key, it is not used or relied on for granting access. It is used for centering and retention. All keys of the system have the same cut and all cylinders have the same pin, thus showing that no differentiation can be made between the keys requesting access based on mechanical configuration of the key. Clarkson employs a complicated communication scheme where the electronic identifying code is located on the key blade. Upon insertion of the key blade into the cylinder the key makes contact with its contact points "key connectors" to the cylinder's contact points "cylinder connectors" by brushing against each other to transfer the data from the key. Since the key electronics are located on the key blade itself, it is not possible to place a keyway profile (milling a grooving configuration) or cuts on the key.

Another similar system although not self contained disclosed in Chhatwal U.S. Pat. No. 5,337,588 (and also Chhatwal 5,507,162) employs an opto-electronic communication between the lock and the key for transmitting data contained in the key to the cylinder for requesting access. In addition the key makes physical contact with the cylinder unit via an isolated contact on the key blade to power the key electronics. The decision making electronics are located outside the cylinder and connected to the cylinder via a cable. Again the cylinder disclosed has a single pin which is used for alignment purposes. The physical size or shape of the pin and or matching cut in the key is not used for differentiating keys from one another, thus not constituting a mechanical key.

A cylinder disclosed by Spahn et al. U.S. Pat. No. 5,469,727 requires both mechanical and electronic elements to be present before granting access; however, the electronic circuitry and the power source are housed elsewhere in the lock and door and wired to the cylinder, requiring additional modification to the door and the lock, and thus defeating the purpose of instant replacement of a standard cylinder.

U.S. Pat. No. 5,140,317, Hyatt Jr. et al. also referenced above, discloses a combined mechanical lock/key combination which further includes an electronic feature for permitting opening of each lock in a system of similarly-keyed locks, only when authorized, and with a recording of each lock opening made. Although the system is not for locks using standard cylinders it is an example of prior art using both mechanical and electronic elements for granting access. The system disclosed in the patent includes a mechanical key with a key cut configuration, and with means for making electrical contact with electronics inside the lock. A separate box carried by the keyholder is connected by electric wiring to the key, the box including a keypad, a microprocessor, a battery for powering the system and the lock, and a memory with stored data. The lock includes a retractable blocking means which blocks opening of the lock's bolt, separately from the mechanical bitting, except when prescribed conditions are met. When a solenoid in the lock is activated the blocking means is retracted. The lock also includes its own microprocessor, which controls switching of power to the solenoid, and with a memory within the lock storing data. The microprocessor within the lock compares coded data read from the key with coded data in the memory within the lock, and thus controls powering of the solenoid to situations in which a comparison, made within the lock's microprocessor, determines that coded data read from the key matches coded data in the lock's memory. The key (i.e. the separate box connected to the key) provides power to the lock's solenoid to allow access. Also, the lock's microprocessor further calculates a new code for the lock, after each opening of the lock.

The above patent is applicable to coin locks and other situations wherein a mechanical key has bitting matched to a large number of similar locks, but where control of the opening of each lock is desired, and where a record is needed of each lock's opening. The system has been applied to pay telephone coin boxes. However, as noted, the system requires a separate box connected by electric wiring to the key, the box containing the equipment noted above. The system is thus unsuitable for applications wherein the key is used to access doors of a building or home as carrying a key along with a box is unacceptable. As stated above the system of the patent also requires additional hardware within the lock casing which defeats the purpose of instant replacement. In addition, considerable modification in retrofitting of existing locks is required, increasing cost of implementing the system, in addition to high cost of manufacture and materials.

A system described by the present application in U.S. Pat. No. 5,552,777, incorporated herein by reference, shows a lock system also applicable to coin locks and other situations wherein a mechanical key has bitting matched to a large number of similar locks, but where control of the opening of each lock is desired, and where a record is needed of each lock's opening. This is an example of prior art using both mechanical and electronic elements of the key for granting access. The power, keypad, microcontroller and memory required for systems operation are incorporated into the key. This eliminates carrying of a box attached to the key. In addition the system of the patent also eliminates use of a microcontroller in the lock and combines the blocking means (solenoid) and the entire circuitry within the plug of a lock cylinder which allows instant replacement to existing locks as the lock described in the patented system is same size as the one it replaces. The key described in the U.S. Pat. No. 5,552,777 containing the keypad, microprocessor, memory and power source, although much smaller than the apparatus described by U.S. Pat. No. 5,140,317 (Hyatt, Jr. et al.), is still generally too large for applications wherein the key is used to access doors of a building or home.

All of the electronic and electromechanical cylinders provided as a replacement unit to the existing mechanical-only cylinders in the prior art are standardized cylinders such as mortise, rim and profile (euro-cylinder) cylinders. The prior art does not provide electronic or electromechanical cylinders for the bored type locks such as knob or lever locks and deadbolt locks.

It is an object of the invention described below to provide a self contained electromechanical lock cylinder which can be installed to lock's existing cylinder cavity or cavities as its mechanical-only replacement and therefore easily retrofitted into existing locks used in doors of a building wherein a number of keys operate one or a number of locks, and which avoids the need for electronics, battery or other hardware which would take up space to be located inconveniently in the lock chassis or lock casing or attached to the door adjacent to the lock and wired to the cylinder. The lock cylinder is operated by a small size mechanical key carrying electronic properties, wherein the key is not larger than an ordinary car key and the mechanical and electronic properties of the key can be used simultaneously, or the electronic properties only can be used at some lock cylinders to grant access while the mechanical properties can be relied on for access at other doors where mechanical-only cylinders are used.

Another object of the invention is to provide a self contained knob or lever unit and a front housing for a deadbolt lock that will instantly retrofit bored type locks with electromechanical cylinders.

In additional aspects of the invention, it is an object to provide an access control system wherein the lock cylinders are programmable with the valid operating keys, in addition limiting the times and dates of the keys' operation as well as providing means for some of the keys to work only a set number of times, and in another embodiment, to record each instance of access to a lock, by key number, in the situation of a lock accessible by a number of different keys. Another object of the invention is to provide easy to use programming methods for programming the cylinders.

SUMMARY OF THE INVENTION

In accordance with the present invention, a key and lock combination achieves the objectives of security in a door lock type system wherein a single or group of mechanical keys are fitted to a single or plurality of lock cylinders. The lock cylinders may or may not contain tumblers or other mechanical combination to be met by a mechanical key; in the case where they contain tumblers or other mechanical combinations, the cylinders may be similarly keyed or may be part of a master keying system. In the case that the cylinders to not contain tumblers or other mechanical combinations, they contain a keyway for accepting a mechanical key having a matching keyway.

The system of the invention includes a software program that runs in a personal computer which is used for programming of the locks and keys as well as performing management functions such as generating reports, audit trail, and adding more locks and keys to the system. The system of the invention includes a key as described in Gokcebay U.S. Pat. No. 5,367,295, which is self-contained, with a key head having memory and battery, as well as a contact point for a one wire bus connection with the lock, or a key with similar features but contact point(s) configured differently. The system also includes a programming key which can communicate with a computer that runs the system software via a serial port. When connected to the computer, the programming key is loaded with data for programming, reprogramming or auditing the locks in the system. Alternatively, communication from the computer to each lock, to identify valid key(s), permissible entry time, etc., can be made via radio frequency.

The lock cylinder of the invention includes an electrically operated blocking means which blocks the rotation of the cylinder plug. This electrically operated blocking means may be a solenoid, motor or another device which may be used alone or in combination to block the cylinder plug from turning.

The self contained electromechanical lock cylinder, which may be a mortise type, is installable into the existing cylinder cavity or cavities providing instant retrofit for existing locksets.

In one specific embodiment the mortise cylinder consists of two interconnectable parts. The first part is the cylinder unit, which has similar outside mechanical features to a typical mortise cylinder in its rear side and a modified front (face) side. The cylinder unit is installed in the cylinder cavity of the mortise lock and a cover unit slides over the face and attaches to the cylinder unit. The cylinder unit contains a typical rotatable cylinder plug with keyway for receiving a key and contains a one-wire bus connection for contact with the key, an electrically operated blocking means which prevents rotation of the plug independently of the mechanical bittings (shear plane tumblers), and a cylinder cam for engaging a latch or bolt mechanism of the lock when the cylinder is operated. The cover unit has a cavity which contains the power source and circuitry that includes a microcontroller which makes the decision to provide power to the electrically operated blocking means to release the cylinder plug only upon specified conditions being met. Also included is an EEPROM for storing access data, ports for connecting to an isolated surface for making connection with the auxiliary power in the case of power failure, LED and preferably buzzer for visual and sound indicators and a multi position connector for making contact with the cylinder unit's connector. The cover unit also has another cavity to receive the front end of the modified cylinder unit wherein upon mating with the cylinder unit the face of the cylinder unit is flush with the outer surface of the cover unit. In the case of power failure, power can be applied externally to the cylinder via external terminals located on the exterior of the cover unit.

In another specific embodiment, the mortise cylinder consists of two connectable parts, the outside cylinder unit and the inside unit. The outside unit is in the size of a standard mortise cylinder containing the standard threading of a mortise cylinder and is installed into the outside cylinder cavity of the mortise lock, and the inside unit has a cylindrical section which is slightly smaller in diameter than the standard mortise cylinder and does not have threads and installs closely into the inside cylinder cavity of the mortise lock, even though that cavity will normally have threads. A rigid self-mating connector or a flex cable connector connects the outside and inside units to one another. The outside unit contains a typical rotatable cylinder plug with keyway for receiving a key and contains a one-wire bus connection for contact with the key, a electrically operated blocking means which prevents rotation of the plug independently of the mechanical bittings (shear plane tumblers), and a cylinder cam for engaging the latch or bolt mechanism of the lock when the cylinder is operated. The outside unit also has isolated terminals for making connection with auxiliary power in the case of power failure, preferably LED and buzzer for visual and sound indicators, and a multi position connector for making contact with the inside unit's connector. The inside unit has a cavity containing the power source (battery) and circuitry which includes a microcontroller to make the decision to provide power to the electrically operated blocking means to release the cylinder plug only upon specified conditions being met, EEPROM for storing access data, and a multi position connector for making contact with the outside unit's connector. In a specific embodiment the inside unit may also contain a rotatable cylinder plug with keyway for receiving a key, and other features similar to the outside cylinder: a one-wire bus connection for contact with the key, a electrically operated blocking means which prevents rotation of the plug independently of the mechanical bittings (shear plane tumblers), and a cylinder cam for engaging a latch or bolt mechanism of the lock when the cylinder is operated. This will accommodate situations wherein a cylinder is required in both sides of the lock or alternatively it may contain a thumb-turn unit for engaging the lock from inside.

The self-contained electromechanical lock cylinder, which may be a rim type, is installable into the existing cylinder cavity or cavities providing instant retrofit for existing locksets or exit devices.

In one specific embodiment the rim cylinder consist of two interconnectable parts, as in the mortise cylinder described above. The first part is the cylinder unit, the second part is the cover unit. The cylinder unit has the same outside mechanical features of a typical rim cylinder in its rear side and a modified front (face) side. The cylinder unit is installed in the cylinder cavity of the rim lock and the cover unit slides over the face and attaches to the cylinder unit. Preferred features are similar to those listed above.

Another specific embodiment of the electromechanical lock cylinder of the invention is in a profile type cylinder installable into an existing cylinder cavity or cavities providing instant retrofit for existing profile cylinder locksets. Preferred features are similar to those described above.

In another embodiment of the invention a self-contained knob or lever unit containing an electromechanical cylinder is provided for replacing the existing knob or lever unit of a mechanical lock. The self contained knob or the lever unit installs on to the knob or lever receptacle of the existing lock. The mechanical-only knob or lever is removed and is replaced with the self-contained knob or lever unit. The self-contained knob or lever unit allows for instant conversion of the mechanical lock to a electromechanically operated lock. In a preferred embodiment the self contained knob or lever unit has features similar to those described above in other embodiments of electromechanical cylinders. The self contained knob or lever unit has a cavity which contains the power source (battery) and circuitry including a microcontroller which makes the decision to provide power to the electrically operated blocking means to release cylinder plug only upon specified conditions being met, EEPROM for storing access data, ports for connecting to an isolated surface for making connection with the auxiliary power in the case of power failure, preferably LED and buzzer for visual and sound indicators and a multi position connector for making contact with the cylinder unit's connector, all as described above. In the case of power failure, power can be applied externally to the cylinder via external terminals located on the face of the knob or lever unit.

In all five described embodiments a decision to grant access is made by the microcontroller by comparing the data read from the key requesting access with the data in the lock's database. Within the lock's database is a list of keys, by serial number or code, which are within the system and have mechanical characteristics that match the mechanical characteristics of the lock. If the serial number or code of the key requesting access exists within the lock's database of serial numbers or codes, with matching of any other criteria which may be programmed (i.e. day of the week or specific time slot, number of times etc.) are met, the access is granted by the microcontroller by supplying power to the solenoid. Upon release of the electrically operated blocking means and shearline created by the matching mechanical configuration of the key to the cylinder, the plug is free to rotate to perform a conventional unlocking action. An LED indicator may also light to show that the cylinder is ready to turn and a buzzer may be used to provide sound indicator for the operation.

In another specific embodiment, the cylinder described above does not contain mechanical bittings and upon release of the electrically operated blocking means the cylinder plug is free to rotate to perform a conventional unlocking action.

In another embodiment, the shearline is created by movement of the locking member indirectly by the release of the solenoid. In this embodiment the solenoid with the power of its spring moves a locking member in a shape of a flat wafer upwards blocking the shearline. The tip of the solenoid's plunger is conic shaped and in its unpowered mode moves the locking wafer by riding on a hole of the wafer by the force of its plunger spring. The wafer is spring loaded with a small spring which in its relaxed condition keeps the wafer away from the shearline; however, since the plunger spring is more powerful than the wafer's spring the wafer blocks the shearline. Upon powering of the solenoid the plunger is pulled in, leaving the wafer spring to move the wafer away from the shearline, allowing the cylinder plug to turn. The wafer hole is oval shaped to allow the retraction of the solenoid plunger even is pressure is applied to the cylinder plug from a prematurely turning key.

The one wire bus connection in the cylinder plug may be generally as disclosed in the above-referenced U.S. Pat. No. 5,367,295, and may have a spring-biased, isolated contact which extends forward from a bore in the cylinder plug; alternatively, the isolated contact may be flush with the plug or recessed, so long as the key's contact reaches the lock's contact. The metal of the cylinder plug forms a ground connection. The one wire bus connection is generally used for the system for communicating data between the key and the cylinder; however, in some cases power may also be supplied to the cylinder by a programming key or another special functioning key for powering the cylinder's electronic circuitry and locking solenoid if the power source of the cylinder fails. The isolated contact described above extending from the cylinder plug may also be located on the cylinder shell, with the relocation of the meeting isolated contact on the key. Alternatively both ground and data contacts on the key could be isolated, meeting the contacts on the cylinder.

The microcontroller which makes the decision to provide power to the solenoid to release the blocking pin only upon specified conditions being met, the EEPROM for storing access data and related circuitry alternatively could be housed within the cylinder shell with or without the electrically operated blocking mechanism such as a solenoid or motor.

In one preferred embodiment the access data is programmed via a programming key which is recognized by the cylinder, and the new programming data is uploaded to the cylinder. The programming data is first loaded to the programming key through the serial port of the computer that is running the system software. When the key is inserted into the cylinder the cylinder reads the relevant programming data for itself and marks the section of the programming key that carried the data for the particular cylinder as read. When the programming key is returned to the computer that is running the system software the programming key is read by the system software via the computer's serial port to verify that the programming is complete for the particular cylinder or cylinders. Alternatively, the programming of the cylinders could be accomplished by insertion of the programming key into a lock cylinder followed by the insertion of the keys followed by the insertion of the programming key. Inserting the operating keys in the window between the first insertion of the programming key and the second insertion of the programming key allows the programming of the lock for the operating keys.

In a preferred embodiment, the opening of each lock is recorded by the microcontroller, in the data storage of the circuitry for audit trail purposes. Depending on the available space or preference, approximately the last 20 entries may be kept in the lock's data storage. Each lock ID in the database is marked as having been opened when that event has occurred, and preferably the time and date are also marked. In the case of a need for audit trail the programming key retrieves the data of the last entries from the lock, uploads the data to the system software running in the personal computer via the serial port of the computer, and prints this information in the system printer. The data includes the keys that have had access as well as attempted lock openings.

The said system software provides a three dimensional matrix that contains the access data for the cylinders including the dates and times when the access is permitted to particular keys or keyholders. This data is loaded on to a programming key which is subsequently entered into the cylinder to upload the access data.

The relating of the access data to the cylinders of the system can also be done via a small radio which is plugged in or otherwise attached to the cylinder of the invention. In this case the access data resides in the system computer, and when a key is inserted to the cylinder the identification of the key is read by the cylinder, which then requests an access decision from the computer. The cylinder waits for the answer and grants access based on the response from the computer.

The cylinders that contain mechanical combinations may be rekeyed or otherwise re-combinated in the manner of typical mechanical lock cylinders, refitting the mechanical bitting (new sets of tumblers). Locks may also be master-keyed to provide or limit access based on the mechanical configuration of the tumblers.

It is thus seen that the mechanical/electronic lock and key of the invention provides, in an extremely compact fashion, electronic access control to a conventional mechanical lock. No additional space in a lock is required to implement the system of the invention. The system is particularly useful where a number of keys are matched to a number of locks such as office building, hospitals, colleges, homes and apartments. These and other objects, advantages and features of the invention will be apparent from the following description of a preferred embodiment, considered along with the accompanying drawings.

DESCRIPTION OF THE DRAWINGS

FIG. 3A shows a blocking pin associated with the electronic access control features, the pin being retracted.

FIG. 5 is a schematic side view showing a cylinder of FIG. 4, showing access control components of the invention along with the cylinder collar means containing the power supply, LED and the jumper terminals in case of power failure.

FIG. 5A is a front elevation view of a cylinder collar or ring of the invention showing the LED and jump terminals.

FIG. 5B is a rear elevation view of the cylinder collar of FIG. 5A showing the cavities for batteries.

FIG. 5C is a schematic side view similar to FIG. 5, with the addition of the radio device attached to the back of the cylinder.

FIG. 13 is a computer program screen of the invention showing the folder menu structure and a multi dimensional matrix containing the access data.

DESCRIPTION OF PREFERRED EMBODIMENTS

Figure 1:
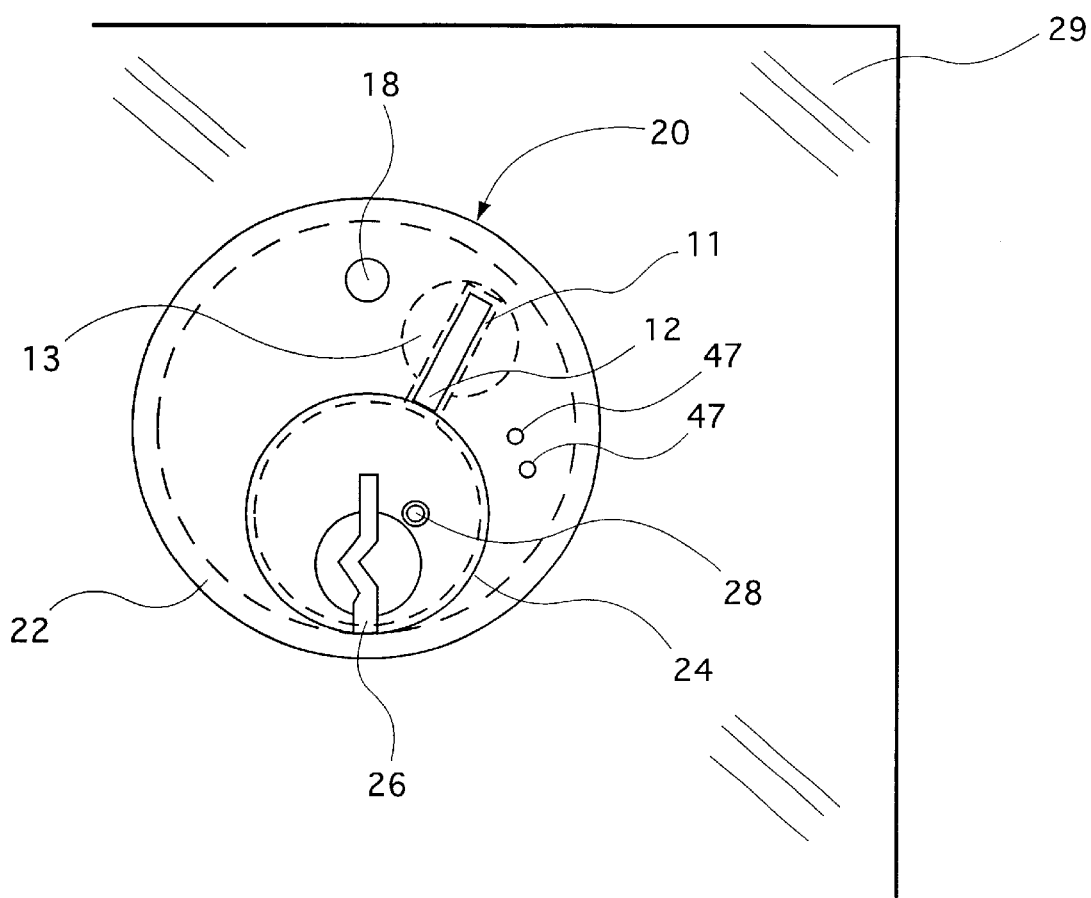
FIG. 1 is a front elevation view showing a conventional mechanical lock cylinder of the pin tumbler type, as an example of an application of the invention, fitted with a one wire bus contact as part of the system of the invention.

FIG. 1 shows a conventional lock cylinder 20 which may be of the pin tumbler type, with a face plate 22 and a cylinder plug 24 which includes a keyway or key slot 26 and an electrical contact 28 which is isolated from the metal of the plug 24. The contact 28 may be formed as disclosed in U.S. Pat. No. 5,367,295, incorporated herein by reference, where the contact is disclosed as being spring-biased for engagement with a contact on a key; it may also be non spring-biased with a head diameter larger than the rest of the contact which is slightly raised above the surface of the cylinder plug 24, with the cylinder plug having a recess at the front part of the bore that is close to the face of the plug to accommodate the head of the contact thus providing protection against a punch attack. Although the described arrangement is generally preferred, the contact can take other forms or can be located in a different area of the cylinder, so long as it is positioned to be engaged by a mating contact from the key. The cylinder 20 also includes a cavity 13 that houses a power supply which supplies power to a circuit contained in the plug 24 and blocking solenoid 36 (show in FIG. 2). In this embodiment, the power is supplied via an isolated spring biased power probe 12 housed in the shaft or bore 11. The ground portion of the power is supplied via the metal of the cylinder body. The probe 12 makes connection to an isolated area 15 of the cylinder plug 24, shown in FIG. 2. The isolated area 15 forming a ring around the plug 24 resides in an insulated cavity 14. The isolated area 15 is connected to the circuit via a cable or contact 16. The cylinder also includes an LED display 18 (FIG. 1) for indicating allowance or denial of access as well as error or warning conditions. FIG. 1 also shows contact points 47 for battery bypass in the case of failure of the cylinders power supply. The cylinder 20 is mounted in an area to be secured 29, or a lock casing.

Figure 2:
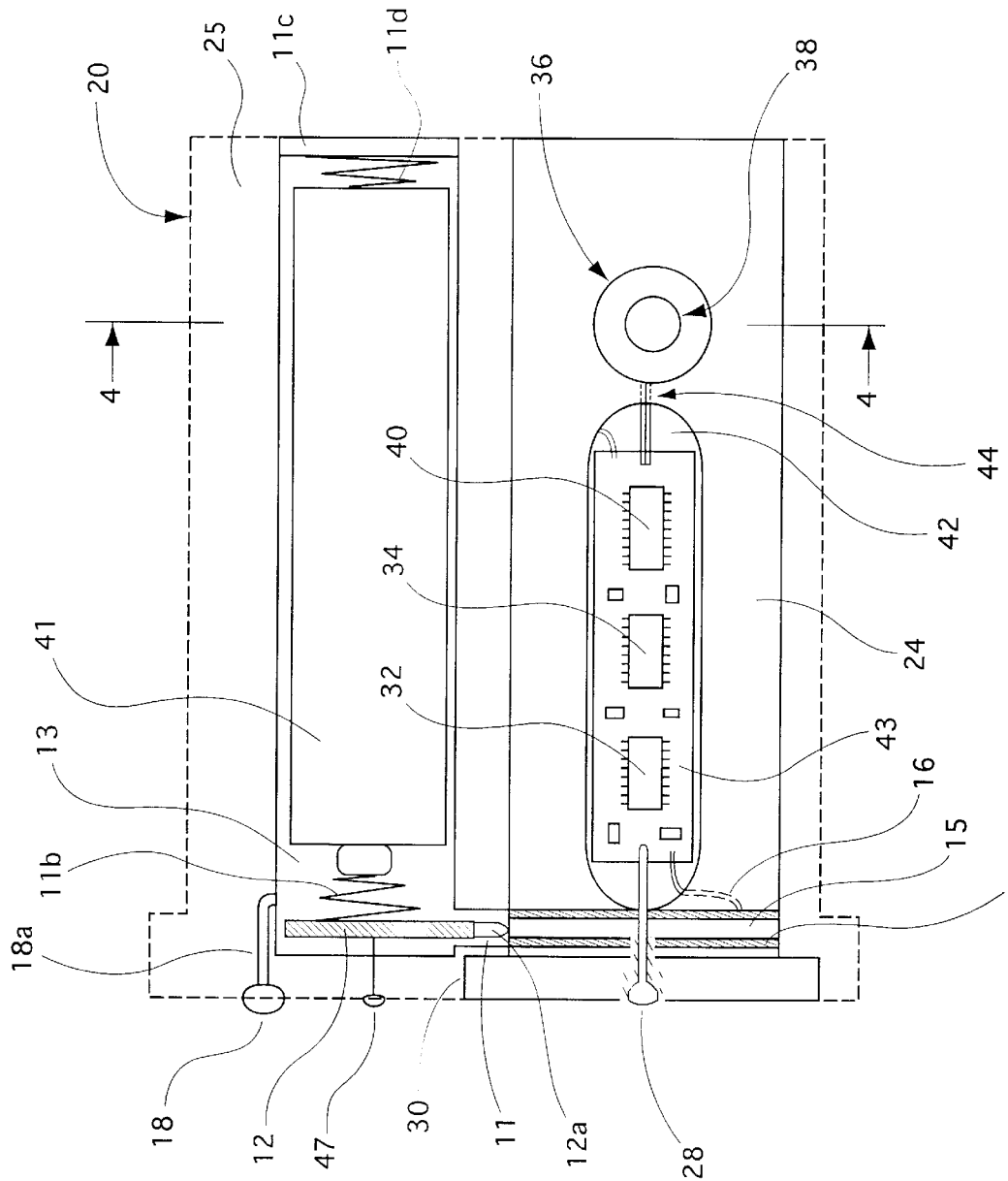
FIG. 2 is a schematic side view showing a cylinder of FIG. 1, showing access control components of the invention.

FIG. 2 shows the lock cylinder 20 in dashed lines and shows the cylinder plug 24 in side elevation. FIG. 2 shows that the cylinder plug 24 has a head 30 of somewhat greater diameter, as is conventional. The contact 28, which establishes a one wire bus protocol for electrical connection to the key, is isolated from the plug, with the metal of the plug serving as ground, is connected to a printed circuit board 43 with components 32, 34 and 40 on a recessed side of the plug. The isolated contact 28 is housed inside the longitudinal bore with larger diameter at the front of the cylinder plug to accommodate the head of the isolated contact. The power probe 12 rests against the isolated section 15 and supplies necessary power to the circuit and the solenoid of the system. The probe 12 has a spring loaded tip 12a which presses against the isolated section 15. Since the isolated section 15 forms a ring around the plug 24 of the cylinder 20 as the plug 24 rotates in the cylinder, the probe rides on the isolated section 15 continuously providing power to the system; however, the isolated section 15 does not need to wrap 360 degrees around the plug 24 to provide power to the system. In fact, a small isolated area meeting the power probe 12 in the cylinder's lock position is sufficient to provide necessary power to the solenoid. Once the electrically operated blocking means 36 is energized to allow access (after the decision to allow access has been made) and the cylinder plug 24 has turned inside the cylinder shell 25, the power is no longer necessary as the locking member 38 of the electrically operated blocking means 36 will no longer block the cylinder plug 24 from turning until it is turned back and aligned with the hole or cavity 50 (shown in FIGS. 3A and 3B). This arrangement of a small isolated surface for providing power to the cylinder also works as a power saving mechanism as once the cylinder plug 24 is turned the power is cut off instead of supplying power for a predetermined amount of time for every instance. Normally, upon insertion of the key to the lock and a positive access decision, the electrically operated blocking means 36 is powered for a predetermined amount of time (i.e., three seconds) giving enough time for the keyholder to turn the cylinder plug 24. If the keyholder turns the cylinder plug 24 in less amount of time the power supply is cut earlier than the said predetermined amount of time providing savings in power. The power is supplied to the solenoid via the cable 44.

FIG. 2 also shows the cavity 11 housing the isolated power probe 12 which makes contact with the isolated section 15 on the cylinder plug 24 via the spring loaded power connector head 12a. The power connector 12 has a spring 11b which makes contact with one end of the battery 41 when the battery 41 is inserted into the power supply cavity 13. The cap 11c has an attached spring 11d which provides connection with the other end (ground) of the battery 41. The cap 11c sits flush with the cylinder body 20.

Figure 2A:
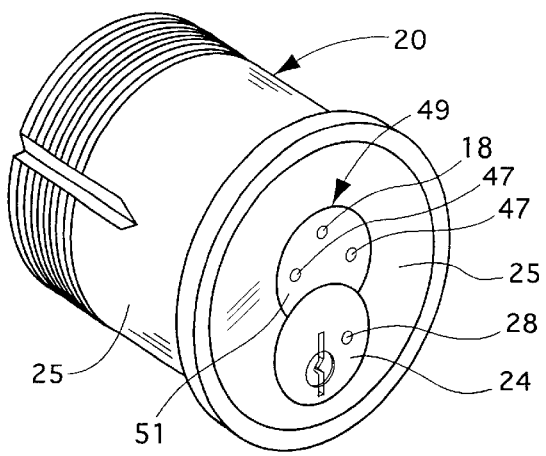
FIG. 2A is a view of a removable core type mortise cylinder.

The FIG. 2A shows an outside view of FIG. 2 with the exception that the cylinder of FIG. 2A has a removable core. The section 49 contains the cylinder plug 24 with keyway 26 for accepting the key and the upper section 51 contains the mechanical bittings or power supply and/or the cylinder electronics depending on the preferred configuration. The removable core 49 also called interchangeable core (IC) as it can be used as a core between different types of locks and cylinders, is removed from the cylinder body or shell 25 by use of a special key (not shown) commonly known as the control key. The LED 18 is located on the section 51 as well as the contact points 47 for external power supply. The LED 18 and the contact points 47 can alternatively be located on the cylinder shell 25 as described above. The cylinder plug 24 preferably contains the circuit board 43, electrically operated blocking means 36 and isolated contact means 28. If the cylinder 20 has mechanical bittings then the power supply may be located in the shell 25 with access through the cavity housing the core 49 or the rear of the cylinder through the removal of the cap 11c (shown in FIG. 2).

Figure 2B:
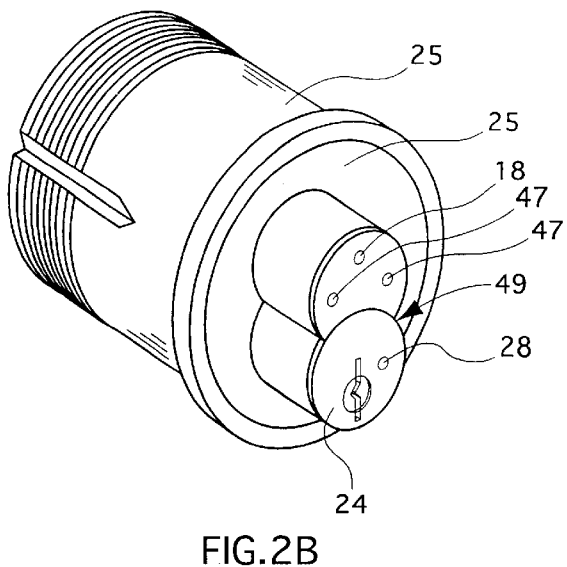
FIG. 2B is a view of the cylinder shown in FIG. 2A with the core section of the cylinder has been removed half way showing the removable core section.
Figure 2C:
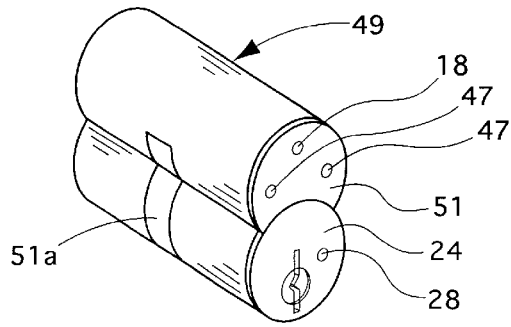
FIG. 2C is a view of the core of the cylinder shown in FIG. 2A.

FIG. 2B shows the section 49 being removed from the cylinder body or shell 25 (the removal key is not shown). The core 49 has a cam 51a which normally locks the core 49 in to the shell 25 of the cylinder 20; see FIG. 2C. The cam is released by the removal key. The power or data connections between the core 49 and the shell are not shown in FIGS. 2A, 2B and 2C; however, the connection means are described with reference to FIG. 2 above.

As can be seen from FIGS. 2, 3, 6, 6A and 6C, the components 32, 34 and 40 preferably are positioned on circuit 43 which is position in a flat or recess 42 in the surface of the cylinder plug 24, or as shown in FIGS. 4, 4A, 4B and 5, in another embodiment the components 32, 34 and 40 are positioned on circuit board 43 which is positioned in a recess or cavity in the cylinder shell 25.

Figure 3:
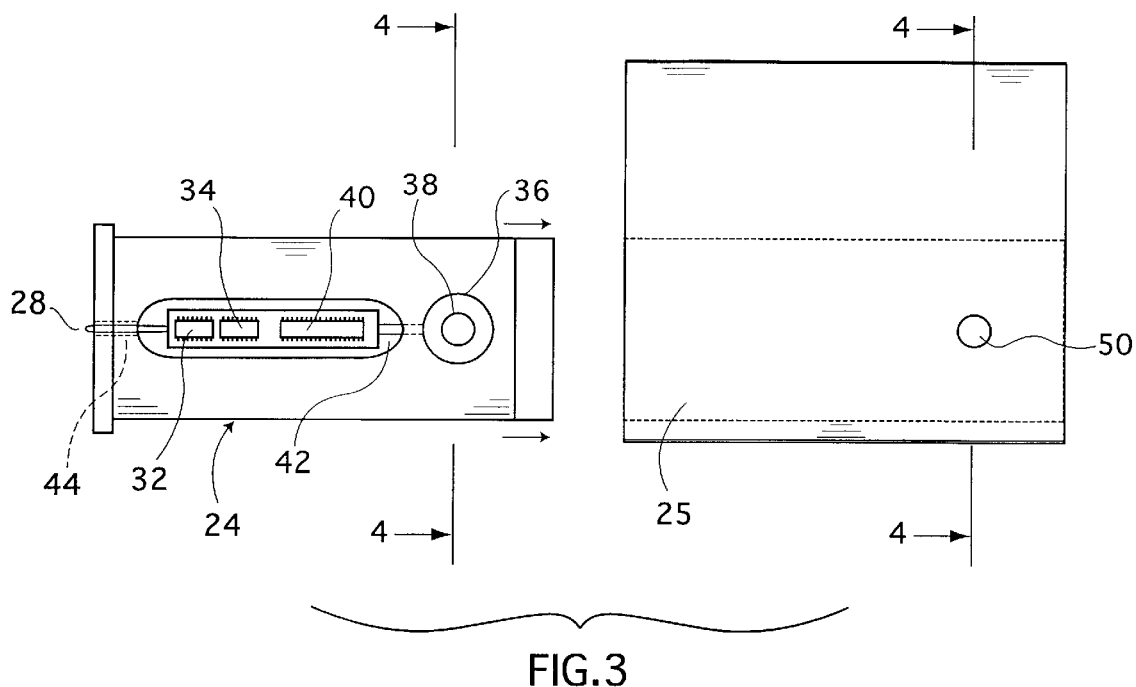
FIG. 3 is a side elevation view similar to FIG. 2, but exploded in form and showing a cylinder plug as removed from a cylinder shell.
Figure 3A:
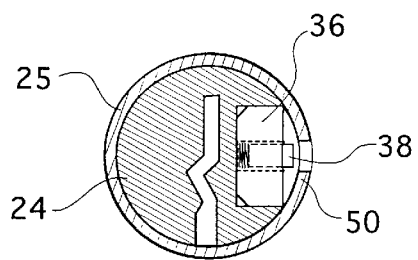
FIG. 3A is a sectional elevation view taken through the cylinder, as seen generally along the line 4—4 in FIG. 2.
Figure 3B:
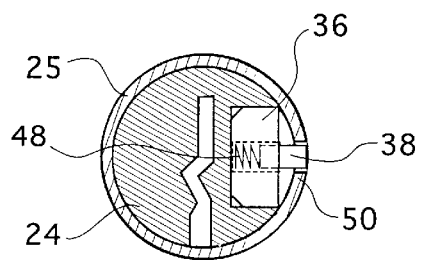
FIG. 3B is a view similar to FIG. 3A, as viewed generally along the same line in FIG. 2, but showing the blocking pin extended and blocking rotation of the cylinder plug.

As seen in the cross-sectional views of FIGS. 3A and 3B, the cylinder plug 24 is rotatable within the cylinder shell 25 (which is drawn as a ring only for clarity) only when the blocking pin 38 has been retracted by the solenoid 36. The pin 38 is biased outwardly by a compression spring 48, to the position shown in FIG. 3B which prohibits rotation of the plug 24. The small solenoid 36 when powered overcomes the force of the compression spring 48. FIGS. 3A and 3B, and also FIG. 3, show a bore or recess 50 into which the blocking pin 38 extends in the blocking position. This bore, recess or groove 50, the bore 11 housing the isolated probe of the power supply and the bore or cavity 13 that houses the power supply are the only modifications required in the entire lock cylinder, other than those on the cylinder plug 24 itself. The bore or recess 50 is easily formed by drilling a hole through the cylinder shell 25 or forming an internal recess or groove on the inside surface of the cylinder shell.

The invention allows for secondary locking "high security" mechanical features, generally located in a side of the cylinder plug. These can be located on the opposite side of that shown in FIG. 3. Examples of such features are Schlage Primus and Medeco Biaxial.

Figure 4:
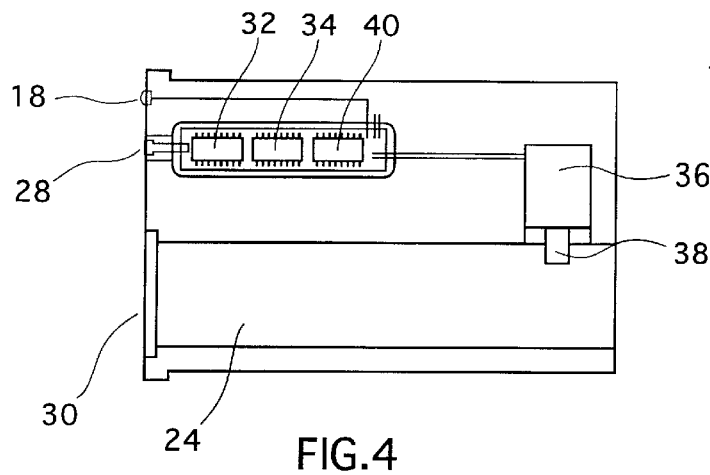
FIG. 4 is a schematic side view showing a cylinder of FIG. 1, showing access control components of the invention moved to the cylinder shell along with the contact means.

FIG. 4 shows the cylinder 20 with the components 32, 34, and 40 along with the blocking means 36 housed in the cylinder shell 25. The isolated contact means 28 is also housed in the cylinder shell 25, for contact with an isolated probe on a key head.

Figure 4A:
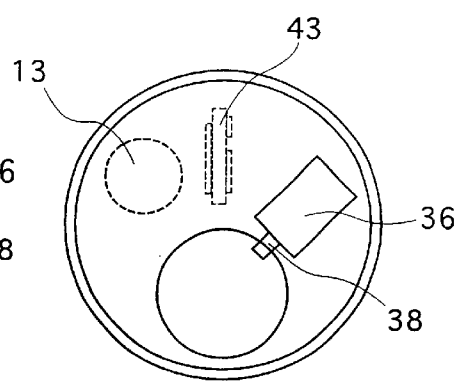
FIG. 4A is a cross sectional elevation view taken through the cylinder, showing the access control components located in the cylinder shell.
Figure 4B:
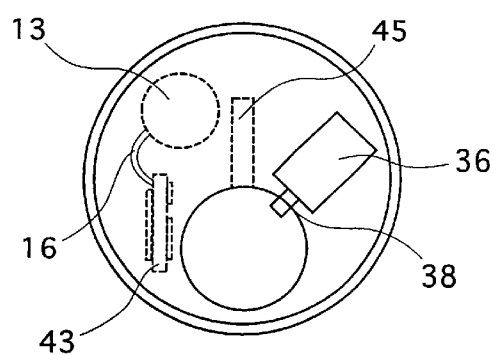
FIG. 4B is a view similar to FIG. 4A, as viewed generally the same, but showing the access control components in a different arrangement which allows the mechanical tumblers to work without interference by the access control components.

FIG. 4A shows a sectional view of the cylinder 20 with an arrangement of the components 32, 34 and 40 placed on circuit board 43 relative to the blocking means 35 and power source cavity 13. The arrangement shown in FIG. 4A does not include mechanical tumblers in the cylinder shell 25. However, alternatively FIG. 4B shows a different arrangement where space 45 is provided for the mechanical tumblers and their functioning without any interference from the access control components of the cylinder 20.

FIG. 5 shows a side view of the cylinder 20 without the battery cavity 13 housed in the cylinder shell 25. Instead a cylinder collar or ring 37 provides a cavity 13a for the battery 41, the LED 18 and jumper points 37a. This arrangement helps easy replacement of the batteries without providing an opening at the rear of the cylinder 20 for removing and replacing of the batteries 41. The connection between the cylinder collar 37 and the cylinder shell 25 is made through spring contacts 37b. The collar 37 also serves as a guard against wrench or other physical attacks to the cylinder 20.

FIG. 5A shows the front elevation view of the cylinder collar 37. The cylinder 20 is placed through the hole 37d of the collar 37 and the ridges 20a of the cylinder 20 which are slightly larger in diameter than the cylinder 20 as standard sits on the bottom ridge 37e of the collar 37.

FIG. 5B shows the rear elevation of the cylinder collar or ring 37 with the battery cavities 13a. The batteries 41 are placed in the cavities 13a providing power supply to the cylinder of the invention.

FIG. 5C shows a radio device 200 secured to the back of the cylinder for providing data communication between the cylinder and a personal computer (not shown). The radio device 200 is activated by the circuitry in the cylinder 20 when a key is inserted into the cylinder. The identification of the key is read through the isolated contact 28 and sent to the radio device 200 for transmitting to the personal computer which also houses a similar radio for receiving and transmitting data from and to the cylinders. Upon receiving of this transmission data the personal computer looks up in its access data table if this key is authorized to open the requesting cylinder at the request time and transmits a "yes" or "no" answer to the cylinder via its radio. Upon receiving the answer and acting out the answer from the system computer the radio device 200 of the cylinder goes back to a sleep mode and the cylinder energizes the electrically operated cylinder blocking means 36 if the answer from the computer was yes.

Figure 6:
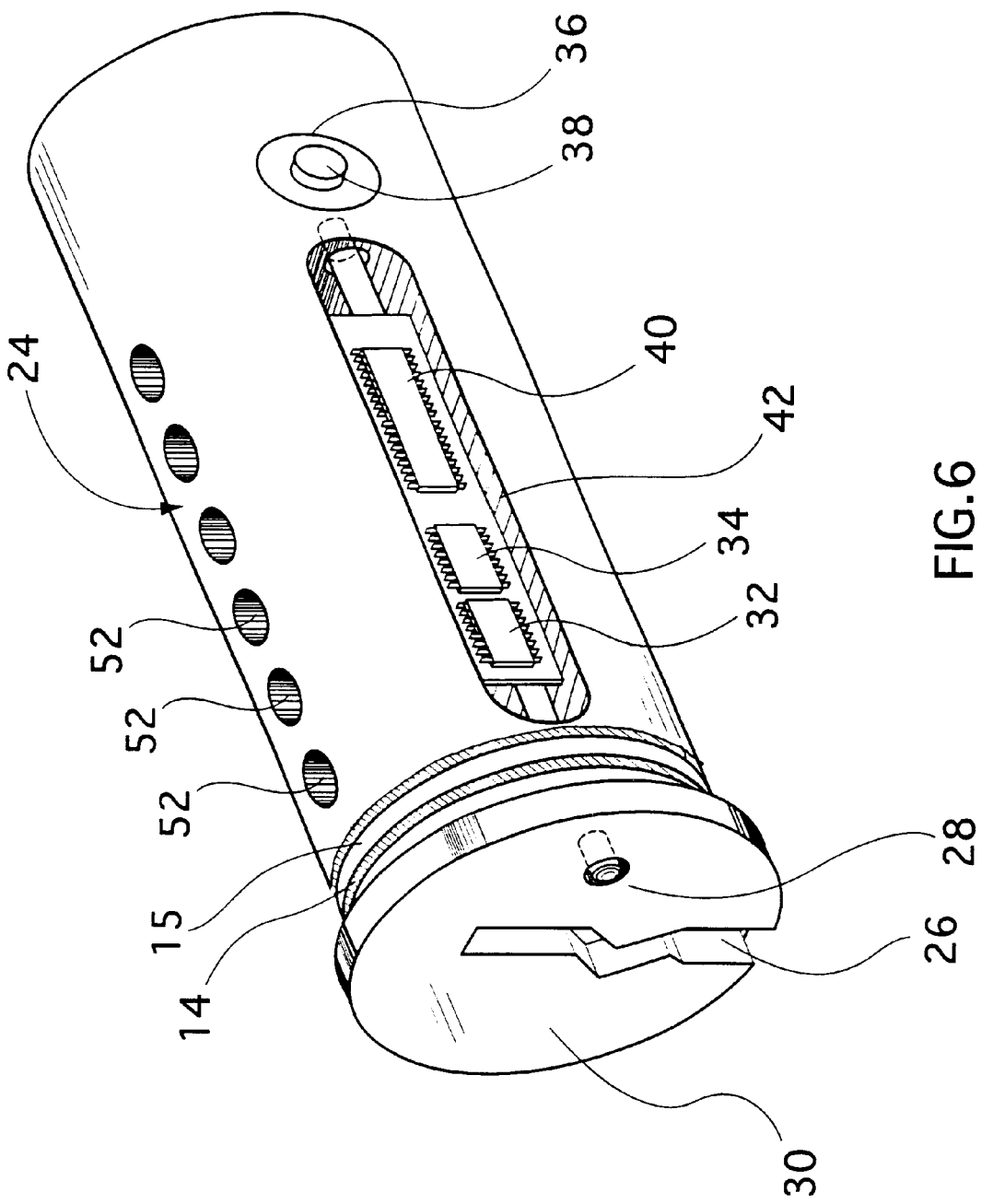
FIG. 6 is a perspective view showing the cylinder plug of FIGS. 2 through 5, and indicating the one wire bus contact, the electronic components and the solenoid-activated blocking pin, as well as a series of bores for conventional pin tumblers.

FIG. 6, showing the cylinder plug 24 without the shell 25, indicates tumbler bores 52 in the upper side of the plug, for the conventional pin tumbler mechanical bittings.

FIG. 6 also shows the component 40 which comprises an EEPROM or other memory device, which can be used for a data storage/transfer purpose described below.

Figure 6A:
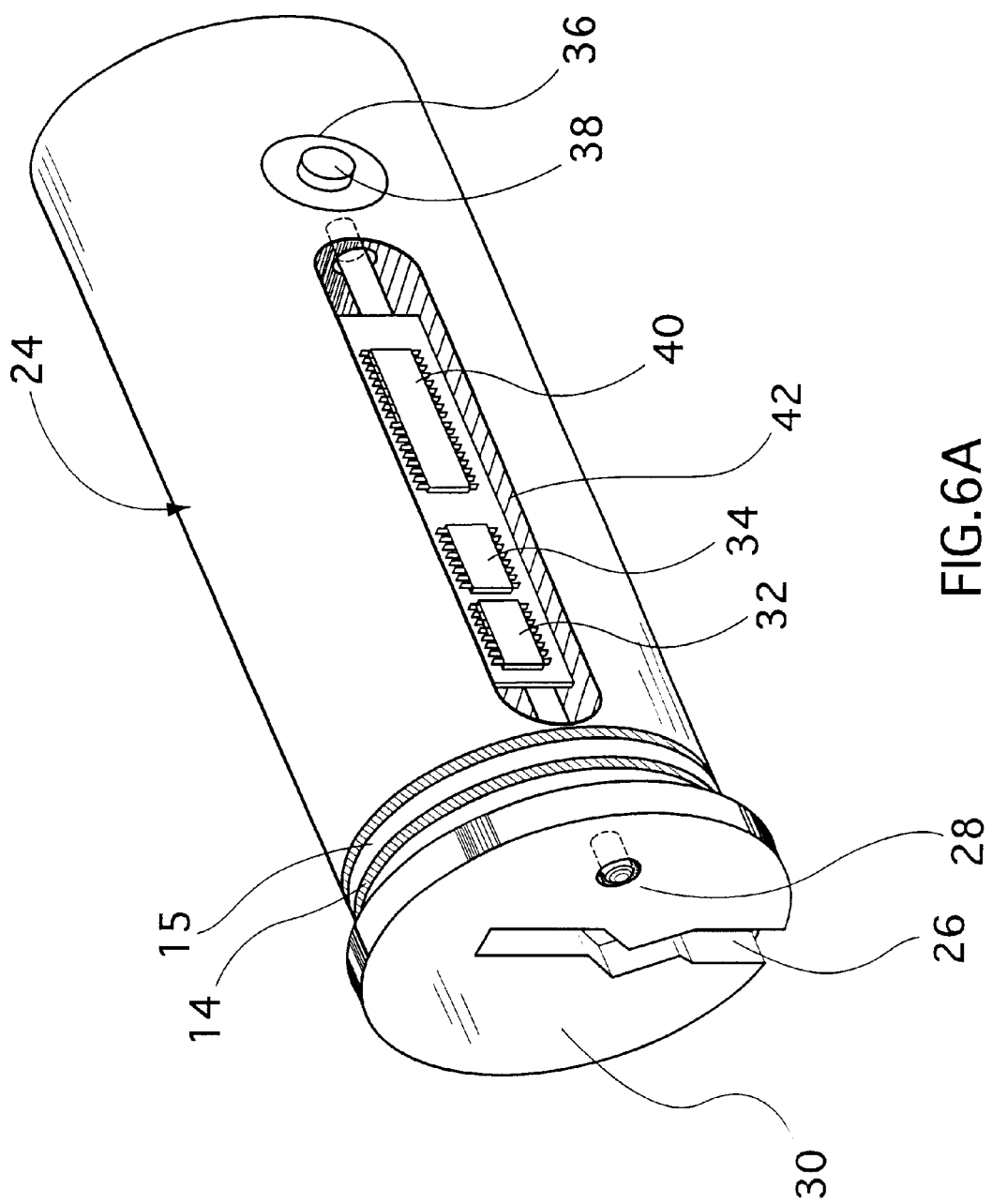
FIG. 6A is a similar perspective view of the cylinder plug without the bores for conventional pin tumblers.

FIG. 6A shows the same cylinder plug 24 of the invention without the tumbler holes 52 providing additional space for the access control components of the invention.

Figure 6B:
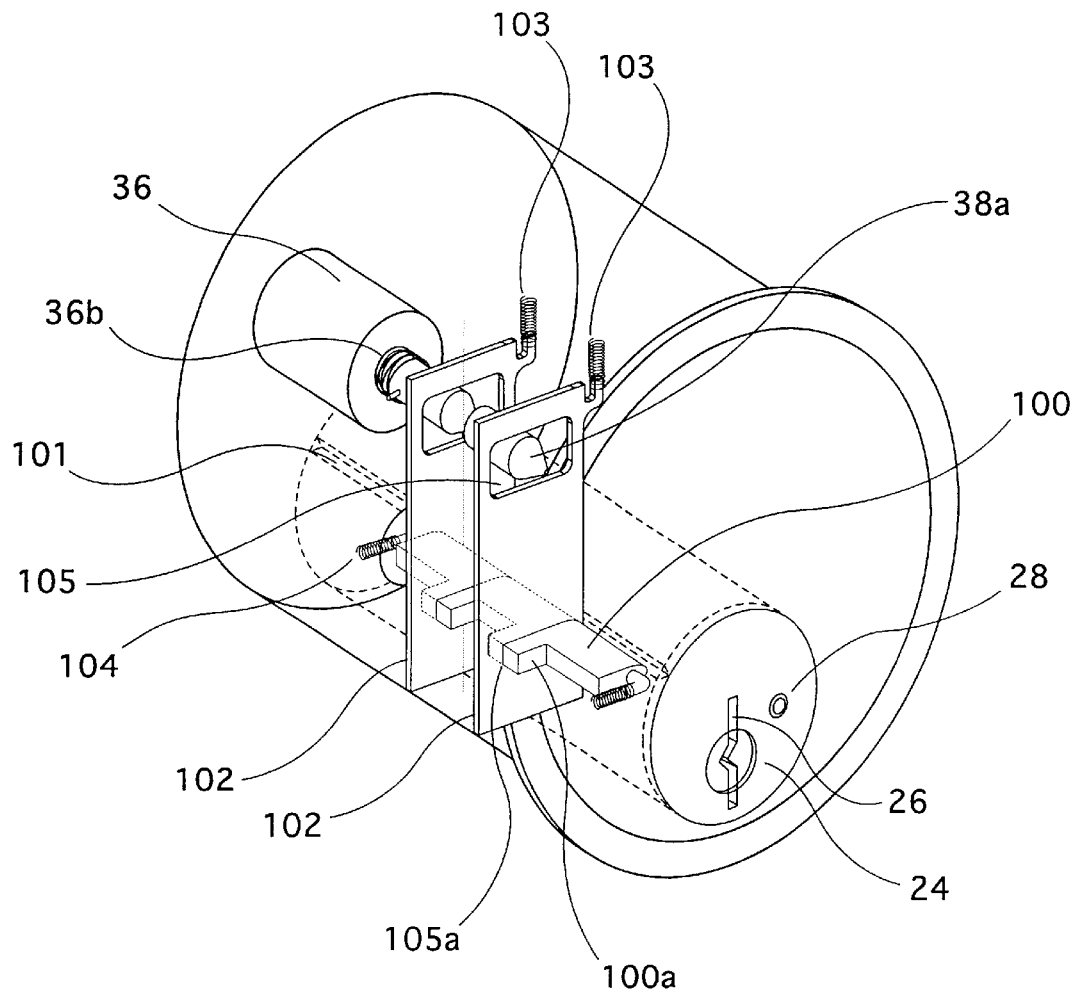
FIG. 6B shows an alternative blocking arrangement wherein the binding of the blocking means is eliminated in case of pressure placed on the blocking means by turning of the key prematurely.

FIG. 6B shows an improved electrically operated locking mechanism in which a side bar 100 in the cylinder shell engages into a V-shaped slot 101 in the cylinder plug 24. Springs 104 push the side bar 100 into the V-shaped 101. Turning of the cylinder plug 24 with a key, when permitted, pushes the side bar 100 away from the cylinder plug. The side bar 100 has an extension 100a which is normally blocked by vertical wafers 102. These wafers 102 ride vertically in a slot (not shown) and upon prior alignment allow the side bar 100 to retract into the unlatched position. Each wafer 102 has a cut out 105a (although the cut out could simply be formed by an L-shaped cut rather than a U-shaped cut as illustrated) that is in the same shape as 100a of the side bar 100. FIG. 6b shows the mechanism in its unlatched position; at this point, the key is free to run. The solenoid 36, in its energized (retracted) mode as shown, frees the wafers 102 to move to their aligned position with the side bar 100. The wafer 102 are pushed into their aligned position by their springs 103. When the solenoid is not energized, the conic shaped edges of the solenoid plunger 38a ride on the oval shaped hole of the wafers 102 by the push of a spring 36b. The power of the spring 36b is stronger than the power of the springs 103; therefore, the wafers 102 move upward, blocking the extension members 100a of the side bar 100. When turning motion is applied to the cylinder plug 24 the side bar 100 with its locking member 100a is pushed toward the wafer 102. If the opening 105a on wafer 102 is not aligned with the locking member 100a of the side bar 100 then the cylinder plug 24 is not able to force the side bar back and turn.

In the case of premature turning motion applied to the cylinder plug 24, the side bar 100 will bind against the wafer 102. However, due to the oval shape of hole 105 of the wafer 102, no side pressure will be applied to the plunger 38a of the solenoid 36.

Figure 6C:
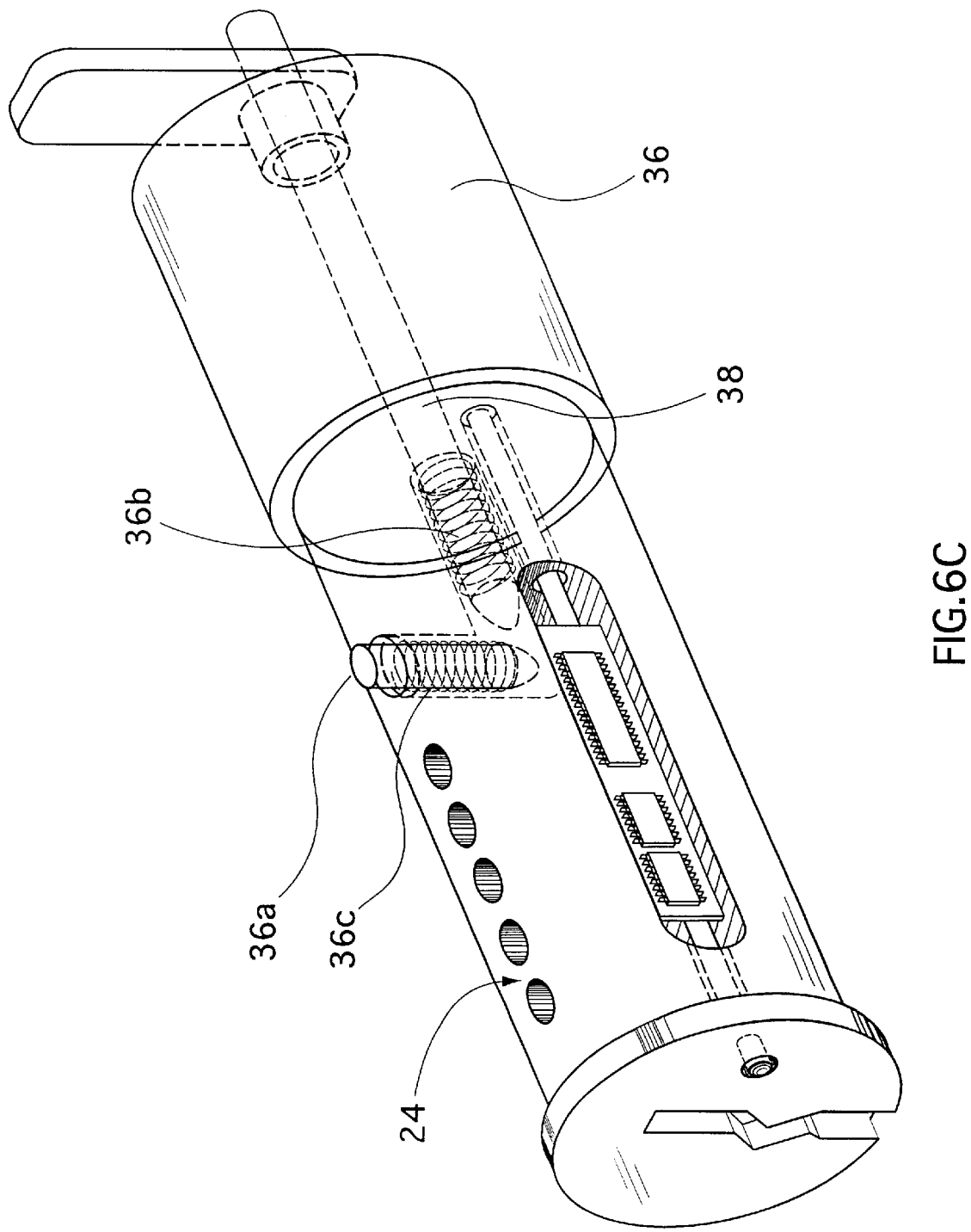
FIG. 6C shows another blocking means arrangement wherein the blocking means is placed axially to the cylinder plug providing an alternative method for the blocking of the plug from turning except when the prescribed conditions are met.

FIG. 6C show the cylinder plug 24 fitted with another electrically operated blocking means wherein a solenoid in the same diameter as the cylinder plug 24 is situated at the rear end of the cylinder plug 24 on the same axis. The plunger or blocking pin 38 of solenoid 36 has a conic shaped tip which extends out with the help of spring 36b when not energized. The plunger 38 with the help of its spring 36b pushes a secondary pin 36a out of cylinder plug blocking its rotation. The secondary pin 36a also has a conic end where it meets the plunger 38. The secondary pin 36a also has a spring 36c which pushes the pin 36a inwards into the cylinder plug 24 (unlocked position). The springs 36c is less powerful than the spring 36b; therefore, the secondary pin 36a stays in the blocking position when the solenoid 36 is not energized. When the solenoid 36 is energized, the plunger 38 moves away from the secondary pin 36a which leaves it free to return to its natural (unlocked) position with the help of its spring 36c. At this point, the cylinder plug is free to turn.

Figure 7:
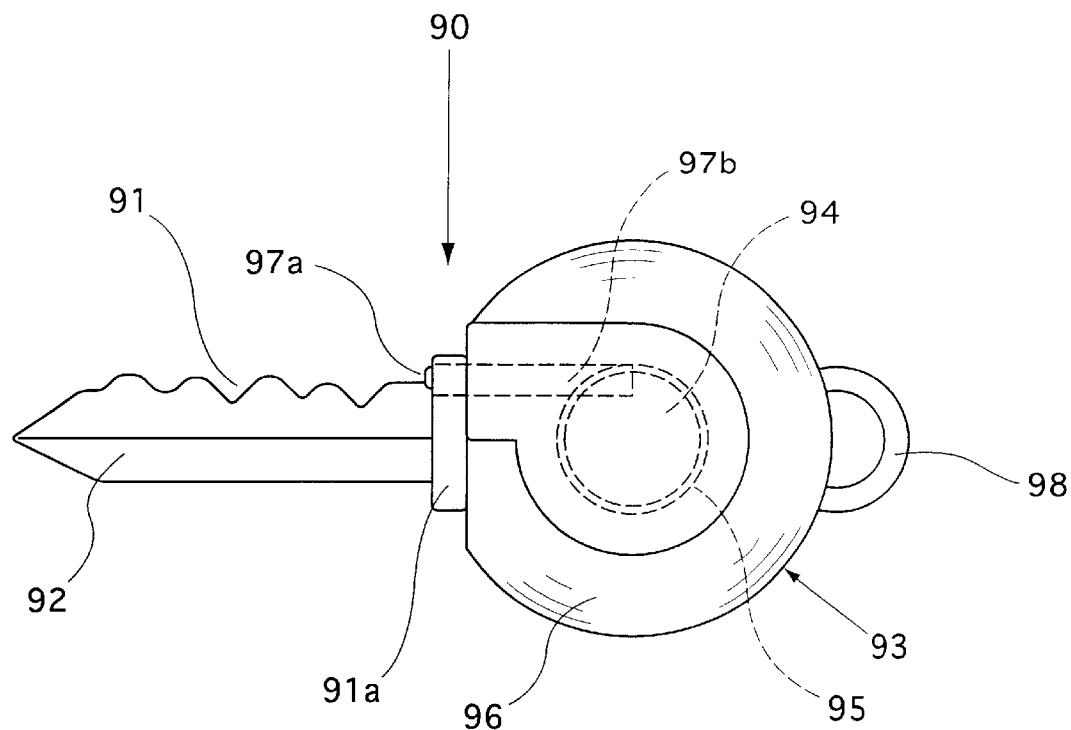
FIG. 7 is a perspective view, somewhat schematic, showing a mechanical key, forming a part of the system of the invention, the key including a mechanical key blade and a key head with identification chip.
Figure 7A:
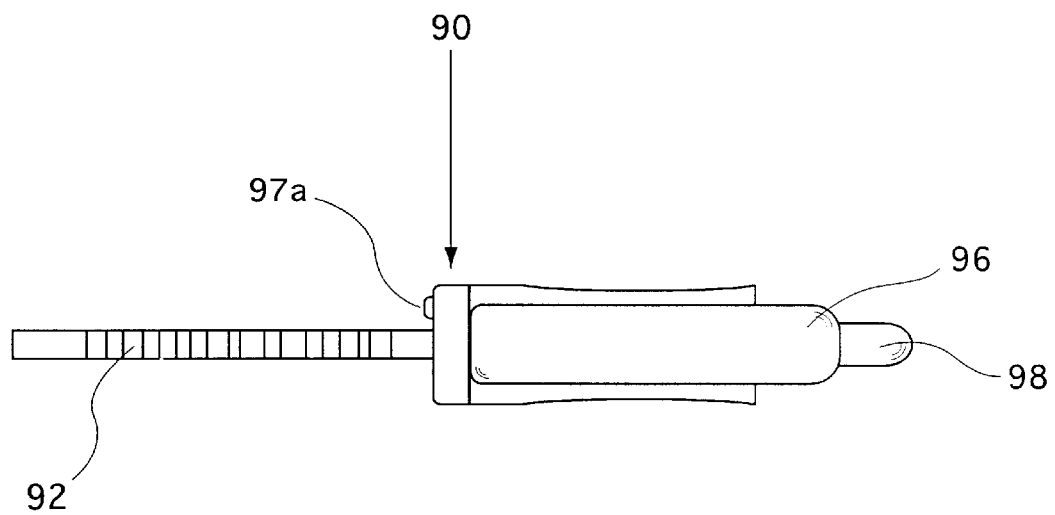
FIG. 7A is a top view of the key shown in FIG. 7.

FIG. 7 shows a mechanical key 90 which has a mechanical bitting pattern, i.e. a key cut 91 on key blade 92, matched to the lock including the cylinder 20 and keyway 26 of the plug 24. The mechanical key bitting is matched in a preferred system to a number of locks, to be accessed and other secured areas in some of which where control is desired as to the timing and frequency of access to a secured area. The key 90 with its bitting 91 can be an individual key in the system or a master key which is matched to a number of secure locks, but wherein access is to be granted to some of the locks that are fitted with the electronics of the system of the invention, only when prescribed conditions are met. The key 90 may also provide access to some locks of the system that are fitted with the electronics of the system of the invention with the use of its electronic properties (i.e. memory cell 94 containing the access data) only. These locks contain no mechanical configuration, i.e. bittings, but contain a keyway for receiving of the key 90 and electrically operated blocking means. The key 90 has a key head 93, fitted with the memory cell or identification chip 94 into its cavity 95. The key head is encased in a plastic or elastomeric casing or cover 96. The outside plastic cover 96 contains the contact probe or contact extension 97 shown in dashed lines which upon closure of the cover over the key makes contact with the memory cell or identification chip 94. The other end or tip 97a of the contact probe 97 is lined up with the shoulder 91a of the key. When the key 90 is inserted into the receiving cylinder, the key contact probe 97 makes contact with the cylinder contact unit 28. Instead of being a part of the plastic cover, the contact probe 97 can be permanently secured to the data connection terminal of the memory cell or identification ship 94 (e.g. by soldering or gluing). They key 90 also has a loop 98 for attaching to a key chain.

Figure 7B:
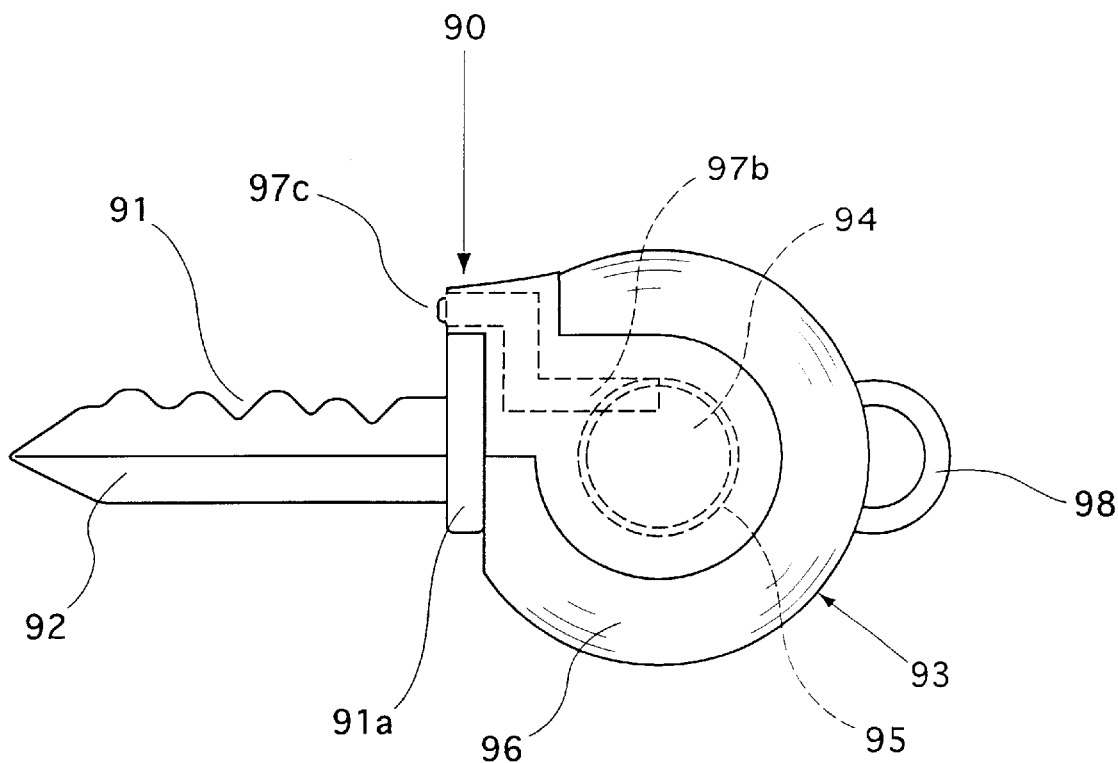
FIG. 7B is similar to FIG. 7, but the contact point moved to a alternative location.
Figure 7C:
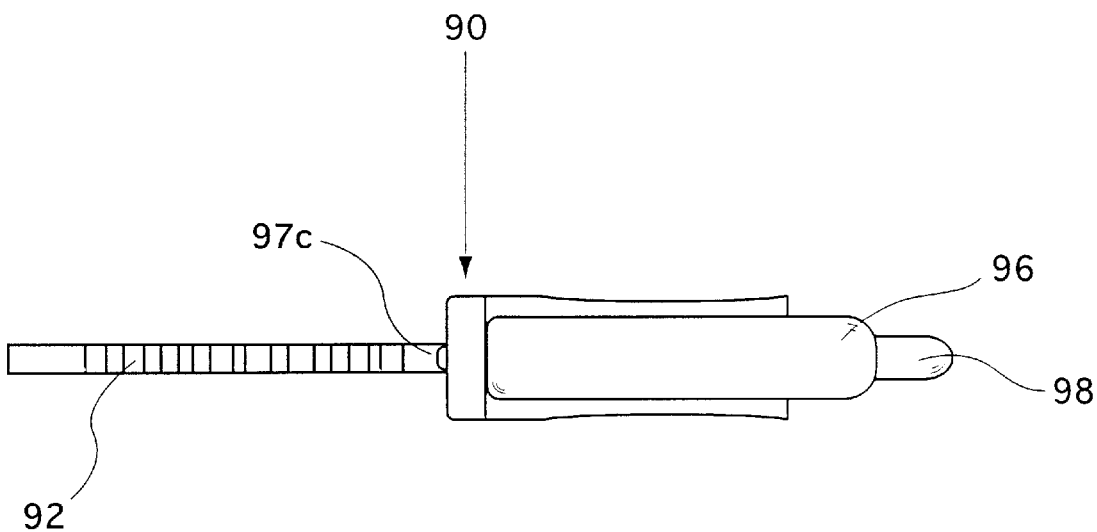
FIG. 7C is a top view of the key shown in FIG. 7B.

FIG. 7B shows a mechanical key 90 similar to FIG. 7 which has a mechanical bitting pattern, and memory cell or identification chip 94 except with the contact point placed at a different location on the key head. The key 90 has a mechanical combination, i.e. a key cut 91 on a key blade 92, matched to the lock including the cylinder 20 and keyway 26 of the cylinder plug 24. The mechanical key bitting is matched in a preferred system to a number of locks to be accessed and other secured areas in some of which where control is desired as to the timing and frequency of access to a secured area. The key 90 with its biting 91 can be an individual key in the system or a master key which is matched to a number of secure locks, but wherein access is to be granted to some of the locks that are fitted with the electronics of the system of the invention, only when prescribed conditions are met. The key 90 could also operate some of the locks of the system wherein no mechanical combination, i.e. bittings, are present by use of its electronic properties, i.e. the data in the memory cell or identification chip 94 only. The key 90 has a key head 93, fitted with the memory cell or identification chip 94 into its cavity 95. The key head is encased in a plastic or elastomeric casing or cover 96. The outside plastic cover 96 contains the contact probe or contact extension 97b shown in dashed lines which upon closure of the cover over the key makes contact with the memory cell or identification chip 94. The other end or tip 97c of the contact probe 97b is lined up with the shoulder 91a of the key directly above the shoulder 91a. When the key 90 is inserted into the receiving cylinder, the key contact probe 97b makes contact with the cylinder contact unit 28 located in the cylinder shell 25 (not shown). Instead of being a part of the plastic cover, the contact probe 97b can be permanently secured to the data connection terminal of the memory cell or identification chip 94 (e.g. by soldering or gluing). The key 90 also has a loop 98 for attaching to a key chain.

The memory cell or identification chip 94 shown in FIGS. 7, 7A, 7B and 7C is a self contained device containing battery, serial number, family code and RAM depending of the type used. This devices are typically models DS1990A, DS1991L, DS1992L, DS1993L, DS1994L and other similar devices manufactured by Dallas Semiconductor, commonly known as "Touch Memory" products. The devices contain a one wire bus protocol. The ground connection to the device is provided from the Bottom and side portion of its steel enclosure and the data connection is provided through the isolated top portion of the steel enclosure. Depending of the Touch Memory device is used the key 90 can be a key used for access as well as a key used for programming, thus providing an alternative programming key arrangement to what is described in FIG. 8. The models DS1991L, DS1992L, DS1993L and DS1994L contain RAM for storing data. This RAM is accessed by the computer program of the system for uploading the programming data and is accessed by the cylinder electronics for downloading the programming data to the lock cylinder. The memory cell or identification chip is placed through a hole 95 of the key head 93 making the ground connection with the memory device or identification chip. The data connection is provided via the isolated contact probes 97 or 97b.

Figure 8:
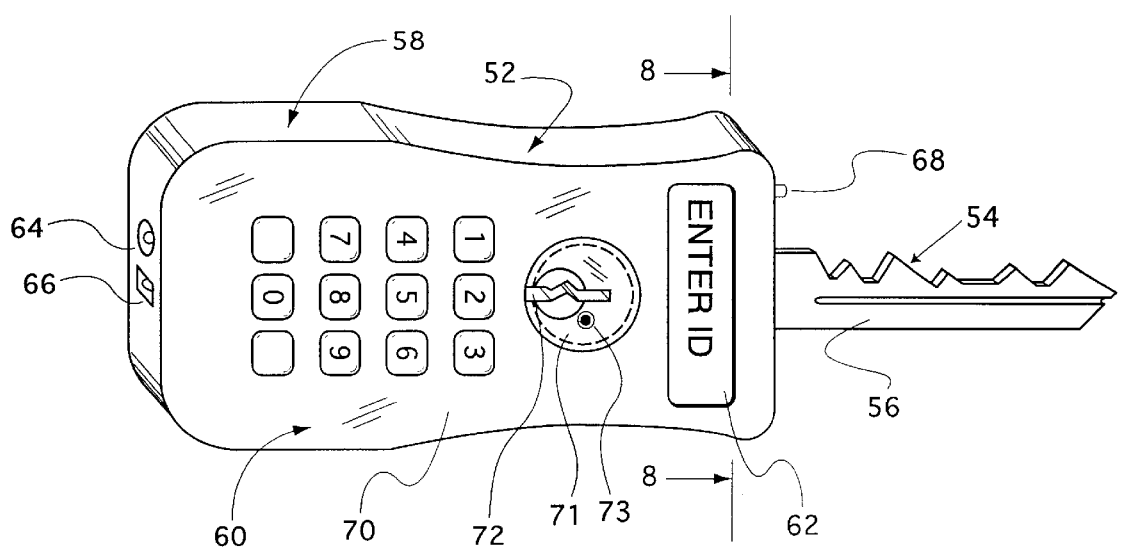
FIG. 8 is a perspective view, somewhat schematic, showing a programming key forming a part of the system of the invention.

FIG. 8 shows in perspective a programming key 52 which has a mechanical bitting pattern, i.e. a key cut 54 on a key blade 56, matched to all of the locks in the system by having the mechanical configuration of the master key. The key 52 has an enlarged key head 58, sufficient to contain internal electronic components and in a preferred embodiment a keypad 60 and, preferably, a small display 62. At a back end of the key head are a data port 64 and a battery recharge port 66. The front of the key head has a one wire but contact 68, isolated from the metal of the key blade 56 and positioned to engage the contact 28 positioned at the front of the cylinder plug 24. It also has a plug 71 that contains a keyway 72 and isolated contact 73 for reading data contained in a key 90 and for programming of the data to the system software when the programming key 52 is connected to the personal computer running the system software with a cable via the data port 64. The plug 71 may also be used for reading of the data contained in the key 90 into the programming key 52, directly without connecting the programming key 52 to a computer. The key head is encased in a plastic or elastomeric casing 70.

Figure 9:
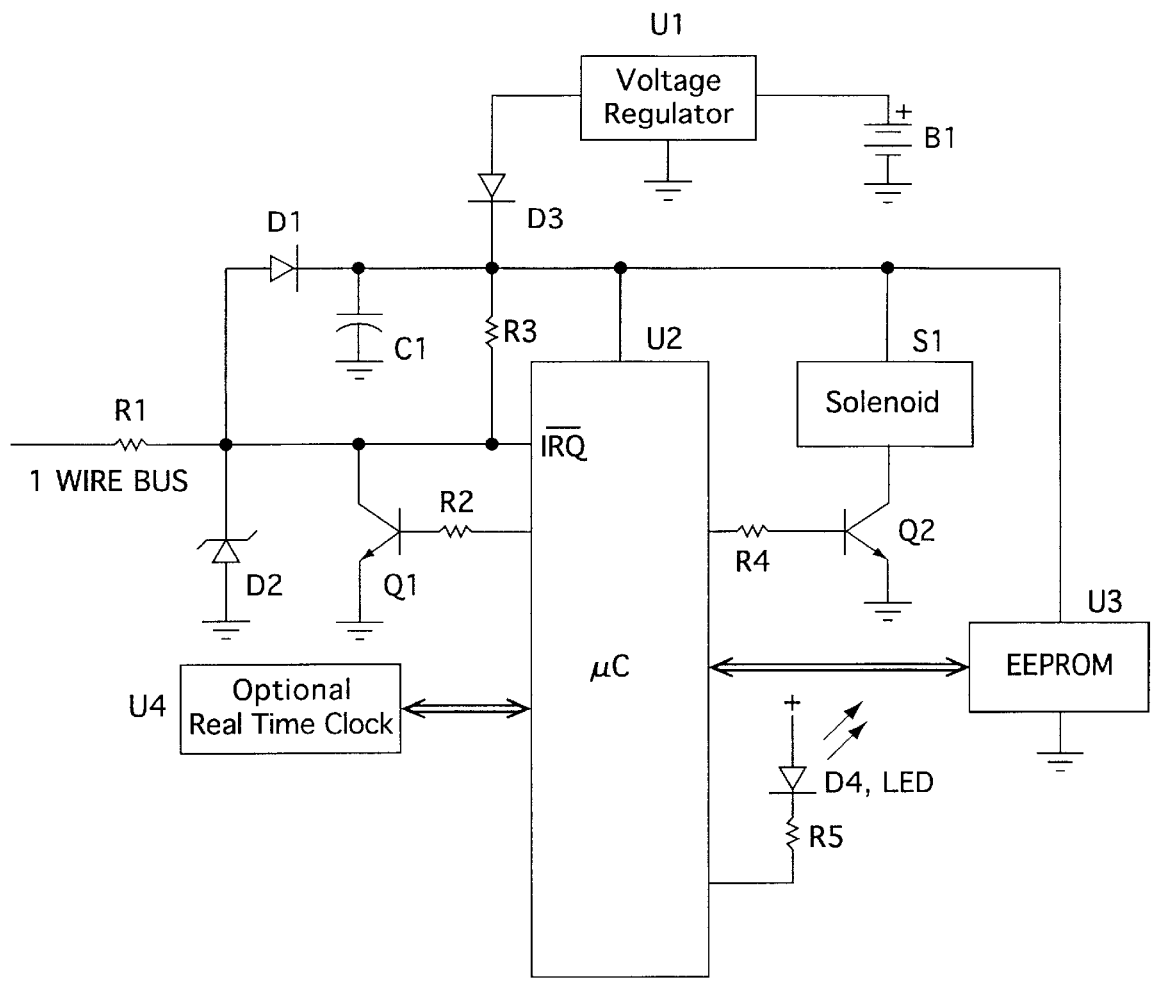
FIG. 9 is a schematic circuit diagram indicating components on the cylinder, for controlling the blocking pin.

FIG. 9 shows a schematic drawing of the circuitry of the invention. The electronic circuitry basically consist of a low quiescent current voltage regulator U1, a microcontroller U2, an EEPROM U3 or other memory device, a solenoid S1, diode D1 to enable the circuit work with the external power when the internal power is lost, diode D2 to protect the circuit from input overloads, a diode D3 to isolate the input from the battery, an LED D4, a capacitor C1 to keep power to the microcontroller when input becomes low, a transistor Q1 to drive the 1-wire bus, a transistor Q2 to drive the solenoid, resistors R1 through R5 and a battery B1. When the battery power is first applied to the circuit the U2 microcontroller which may be the MC68HC705J1A from Motorola, is reset. Upon reset, the microcontroller configures its ports, serially reads the lock serial number from the EEPROM and keeps it in the RAM, and goes into STOP mode, the lowest consumption mode. It can be brought out of this mode only by a voltage drop (supply voltage to zero) at its IRQ pin.

When a key housing the Touch Memory is inserted into the keyway, all the way, the Touch Memory encapsulated on the key is connected to the 1-wire bus through the contact 28; it then pulls the bus and IRQ pin of the U2 low causing an interrupt to the microcontroller. This interrupt brings U2 out of STOP mode.

In one preferred embodiment, in the normal operation mode, U2 first reads the serial number of the key to authenticate it, also decides if the key is an ordinary user key (with, e.g., DS1990) or a special user key (with, e.g., DS1994) or a programming key. If it is an ordinary user key, U2 then reads the first ID number from EEPROM, and searches if the special code in the key's serial number matches one of them. If it matches, U2 then energizes the solenoid S1 through R4 and Q2. This would allow the user to turn the key and open the door.

If there is no match then U2 reads another ID number and tries to match. If there is no match despite all the EEPROM locations being read then U2 registers this as a false entry and (optionally) turns on the red LED to indicate that the attempt has failed.

It should be understood that a microcontroller containing larger RAM could be used to avoid the serial routine described.

If there is also a time condition on this entry, U2 also checks if the time is appropriate for this user to enter. The necessary time information may obtained either from the key (special user key with DS1994L) of from the, Real Time Clock U4. In FIG. 2, 32 represents the microprocessor U2, 34 and 40 represent the remaining electronic components (36 is the solenoid).

Figure 10:
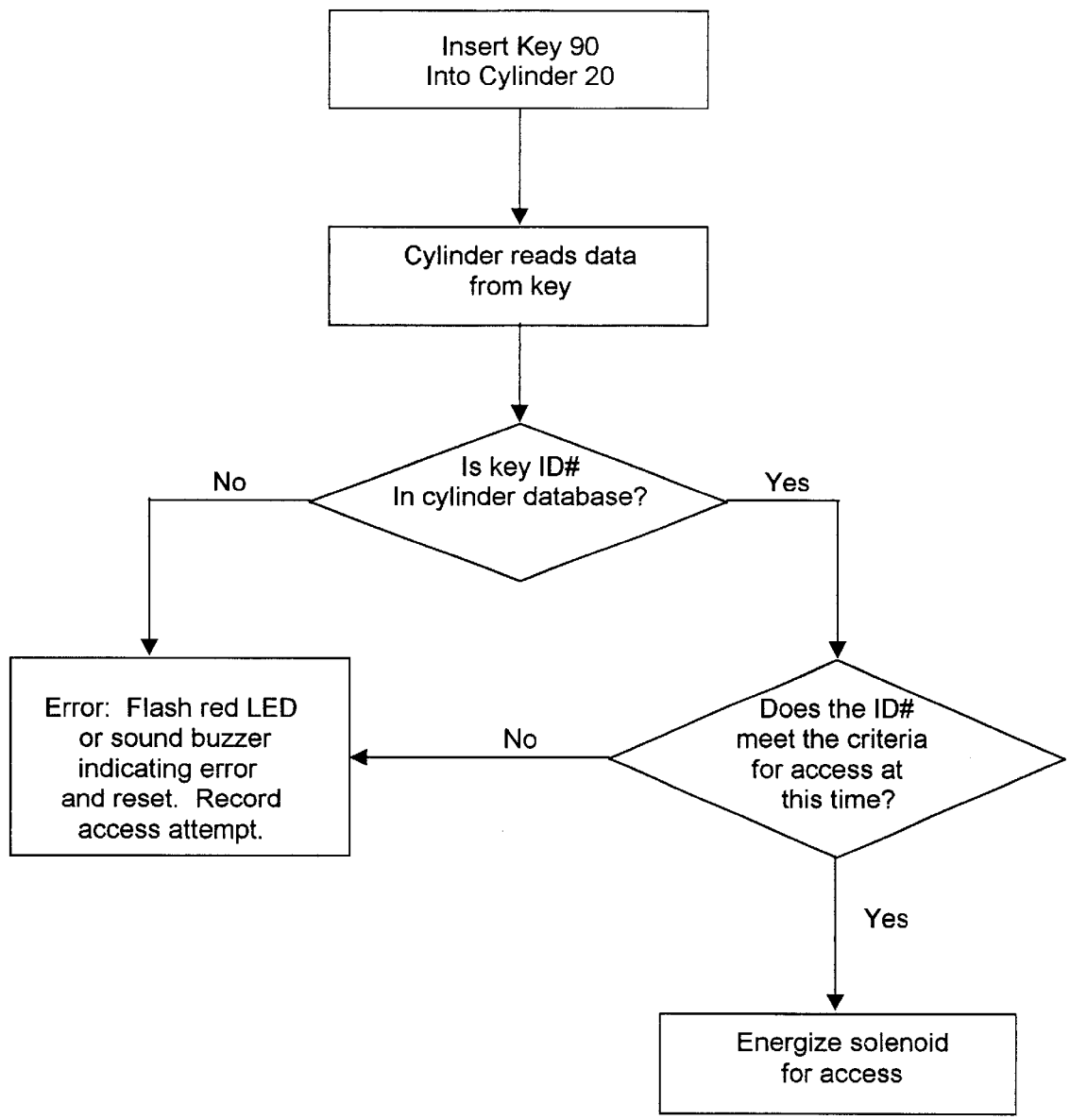
FIG. 10 is a flow chart indicating steps in use of the mechanical/electronic key and lock of the invention.

FIG. 10 is a block diagram that shows in a preferred embodiment how the system of the invention functions. When the key 90 is inserted into cylinder 20 the key's identification data is read by the cylinder and this identification data is compared to the database of identification numbers programmed in the cylinder's database. If the read identification data from the key does not match or is not found in the cylinder's database the key is rejected and access is denied. This condition may also be indicated by flashing the LED or a buzzer. This condition is also recorded by the cylinder database as an attempted access by an unauthorized key. If the read identification data from the key does match or is found in the cylinder's database than the identification data is checked (if required) against other access criteria such as date and time, number of entries allowed this keyholder, etc. If all access criteria are met, then the cylinder's locking solenoid is energized for access.

Figure 11:
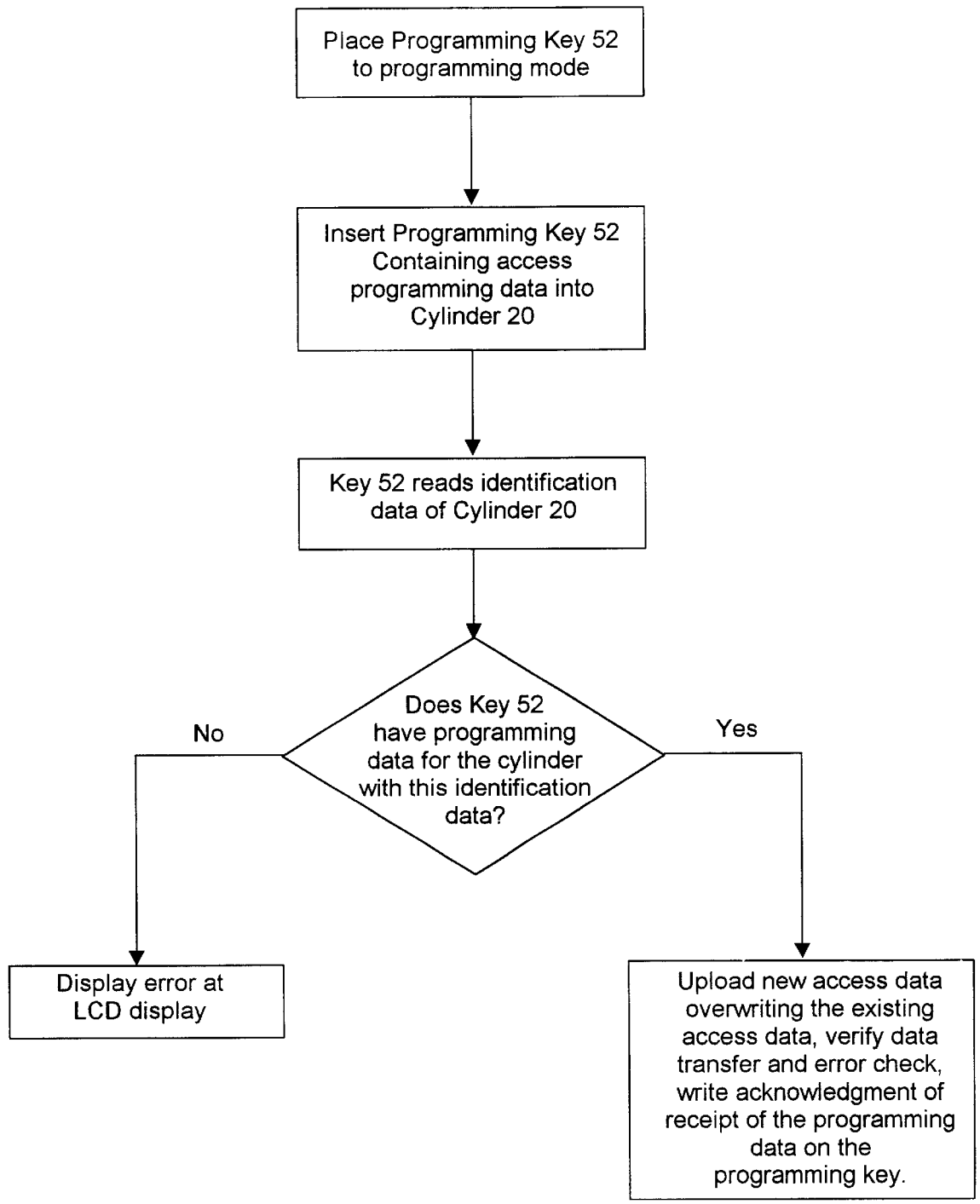
FIG. 11 is a another flow chart, indicating transfer of data between a programming key and cylinder for programming of the cylinder.

FIG. 11 shows a programming routine for the system of the invention. The programming key 52 is first set to its programming mode which may be by use of the keypad 60 or which may be by connection to the computer. The programming key may also be the key 90 containing RAM such as model DS1992L manufactured by Dallas Semiconductor. The placement of the key 90 into its programming mode is done by writing a special code on to the key's memory that indicates to the reading lock cylinder that the inserted key is there to program.

The programming key is then inserted in to the cylinder 20 to be programmed. The programming key 52 is recognized by the cylinder 20 because of its identification data. The programming key 52 reads the identification data of the cylinder 20 and compares this data to the database of cylinder identification data to be programmed. If the identification data read from the cylinder 20 does not match or exist in the programming keys database, then the programming key displays "ERROR" at its display 62 if the programming key is the key 52; if the programming key is key 90 containing the DS1992L then the "ERROR" is indicated by the cylinder's LED 18 flashing red. If the identification data read from the cylinder 20 is matched than the programming key uploads the new programming data into this cylinder and verifies the data transfer. The cylinder 20 is now programmed with the new opening codes.

Figure 12:
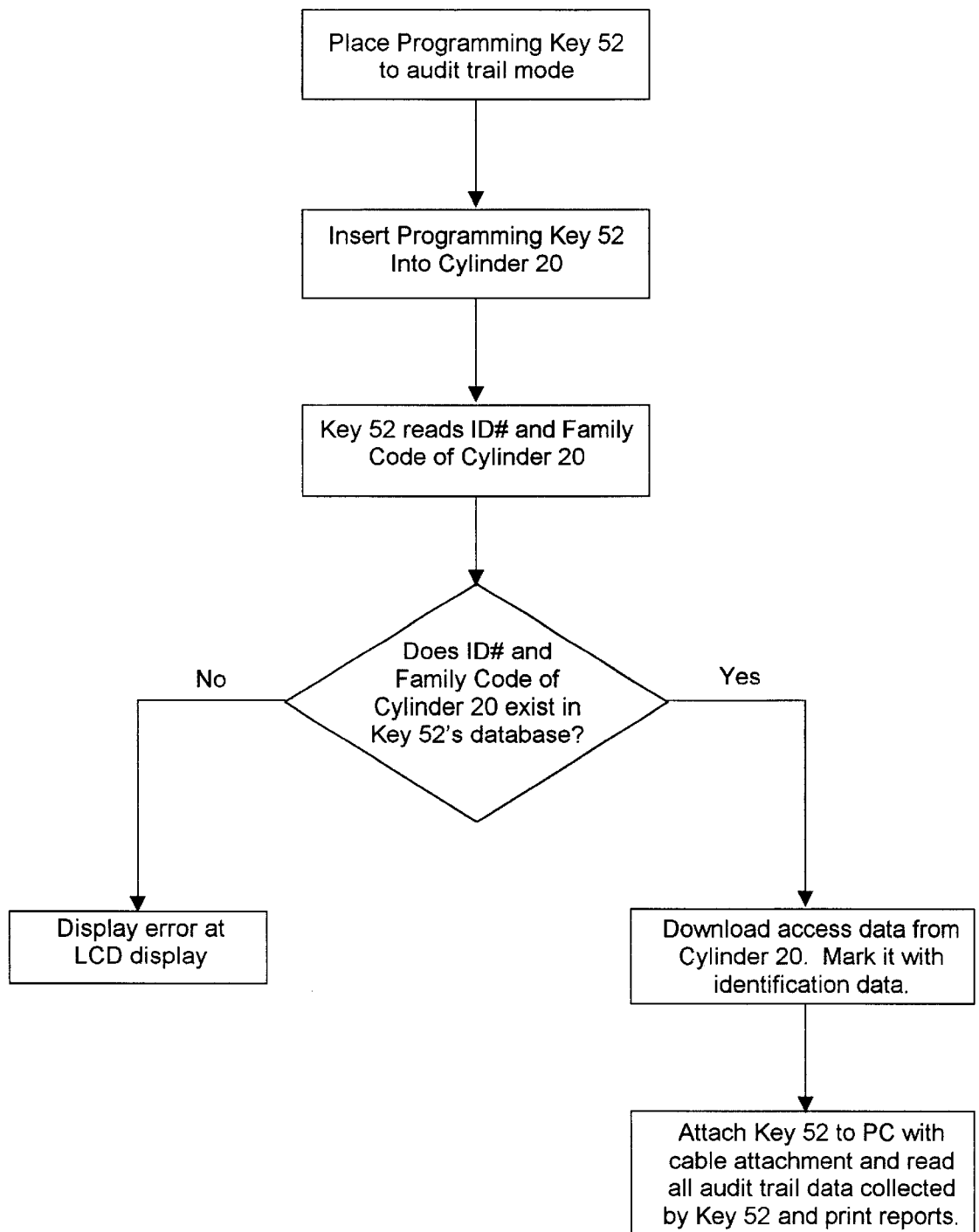
FIG. 12 is another flow chart, indicating transfer of data between a programming key and cylinder for audit trail of the cylinder.

FIG. 12 shows an audit trail routine for the system of the invention. The programming key 52 is first set to its audit trail mode by use of the keypad 60 or which may be by connection to the computer. The programming key may also be the key 90 containing RAM such as model DS1992L manufactured by Dallas Semiconductor. The placement of the key 90 into its audit trail mode is done by writing a special code that indicates to the reading lock cylinder that the inserted key is there to audit trail. The programming key is then inserted in to the cylinder 20 to be audited. The programming key 52 is recognized by the cylinder 20 because of its identification data. The programming key 52 reads the identification data of the cylinder 20 and compares this data to the database of cylinder identification data to be audit trailed. If the identification data read from the cylinder 20 does not match or exist in the programming key's database, then the programming key displays "ERROR" at its display 62 if the programming key is the key 52; if the programming key is key 90 containing the DS1992L then the "ERROR" is indicated by the cylinder's LED 18 flashing red. If the identification data read from the cylinder 20 is matched than the programming key downloads the audit trail data that resides in the cylinder and verifies the data transfer. The programming key 52 now has the audit trail data for this cylinder.

Figure 13:
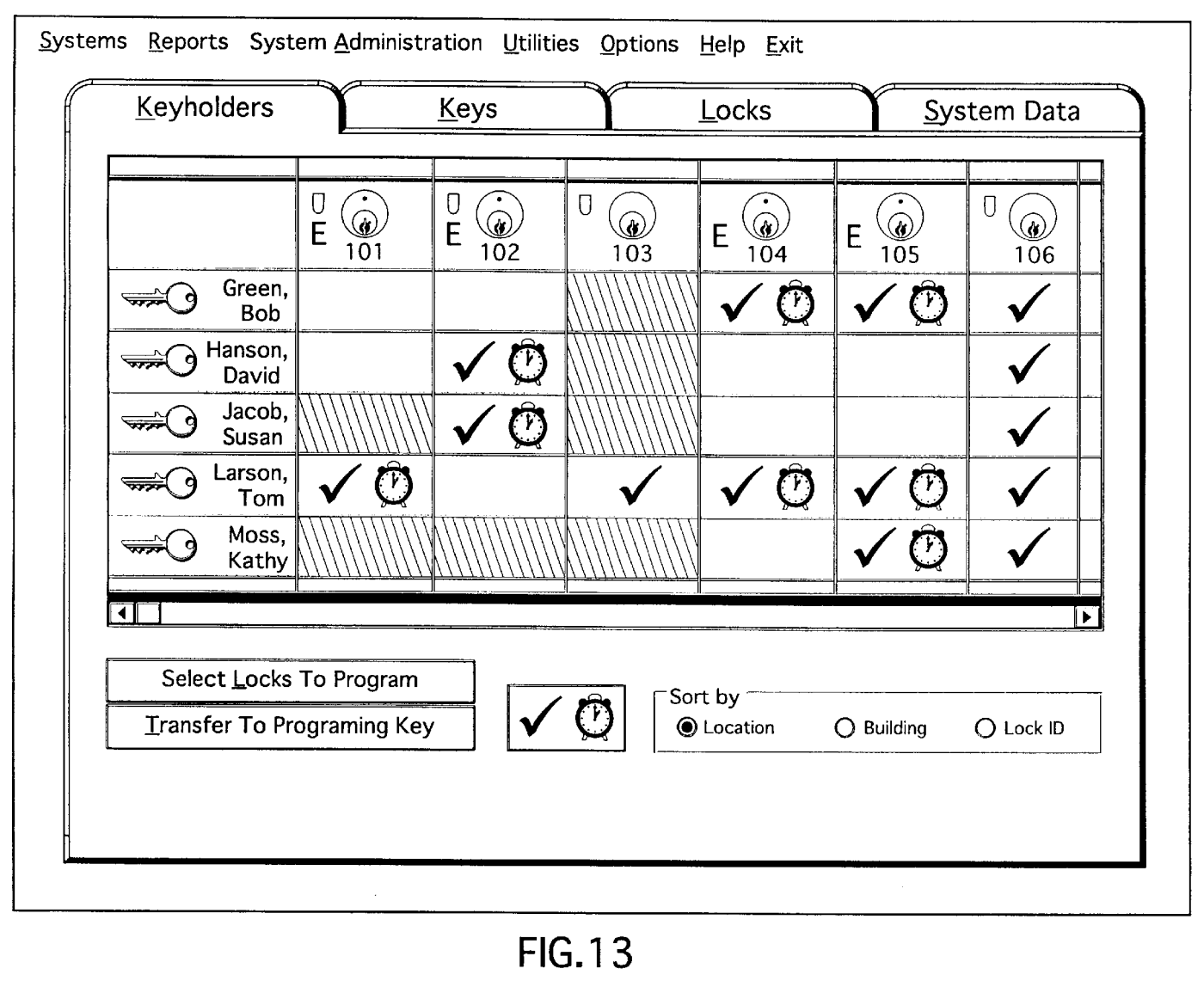

FIG. 13 shows the system setup screen of the software of the invention wherein the doors (representing the locks or locks cylinders) and keys of the system are displayed in a matrix. FIG. 13 also shows other sections of the software of the invention as represented by folders and a menu bar. Although many different functions or features can be incorporated to such program, the basic functions should include programming the lock, key and keyholder data and utilities for adding and deleting of the same.

Any of the doors may be set to open by any of the keys by marking the box that enjoins them. This programming further includes time and date setup for each entry by another screen (window) reached by pressing enter (or double clicking of a mouse) on a clock icon at the marked enjoining box. Although it can be accomplished in many different forms (including without the use of a personal computer running a software for programming) this easy to implement programming provides a utility to program a system setup wherein polarity of keys operate polarity of locks.

The system setup screen (marked as "System Data" on its folder) of the software of the invention contains data about the cylinders and keys of the system. The information about the locks, i.e. the type of cylinder such as mechanical cylinder with electronics or mechanical only or electronic only, its mechanical bitting (if contains mechanical properties), their installed location and other relevant data; the information about the keys, i.e. the type of key, mechanical combination and its keyholder; the information about the keyholder, i.e. name and address, are entered into the program using the appropriate folders of the program. When in the system setup screen, the cylinders and their information are placed across the screen horizontally and the keys that have been issued to keyholders are placed across the screen vertically creating a matrix with horizontal and vertical cell intersections. Each intersection represents the area where the access data for meeting lock and the key is placed.

As displayed in FIG. 13, cylinders which contain both mechanical and electronic properties can be separated from the ones that are mechanical only and/or electronic only cylinders. For example, the cylinder of location 101 is a cylinder containing both mechanical (indicated by mechanical tumbler symbol next to the cylinder) and electronic (indicated by "E" symbol next to the cylinder) properties. The cylinder of location 103 is a mechanical only cylinder without the "E" symbol but the cylinder of location 104 is an electronic only cylinder without the mechanical tumbler symbol. The keys are also displayed with their keyholders. Since the data regarding the keys and their mechanical combination and locks and their mechanical combination have been entered previously as described above, when in the "System Data" screen, certain cells are blocked indicating that the particular key does not have mechanical properties that will operate the corresponding cylinder. Some of the cells are marked automatically with a "4" indicating access to the corresponding cylinder when the cylinder is a mechanical only cylinder and the keys' mechanical properties operate the corresponding cylinder. The rest of the cells are marked by the administrator of the software program when appropriate by double clicking on the cell to grant access. The cells that the administrator double clicks to provide access contain a clock icon. The administrator clicks on the clock icon to select times and days access is granted to the key for the corresponding cylinder. The programming discussed here also allows a temporary blocking to certain keys to certain locks for a period of time determined by the software's administrator. This feature is used when the blockage is temporary. This eliminates deletion and reentry of the data into the system database. After the temporary blockage is applied using the system software using system software's utilities menu the programming key is loaded with this data as described above and the programming key is taken to the locations involved for updated programming. Alternatively, the programming of the cylinders could be done by insertion of the programming key 52 or programming key 90 followed by the operating keys then followed by the programming key 52 or programming key 90 allowing the programming of the operating keys into the cylinder's database. When additional keys are required to be added to the list of operating keys the same procedure is followed except this time insertion of the key(s) to be added only between the first insertion and the second insertion of the programming key. If a key(s) are lost the programming key is inserted twice without insertion of any other key(s) which clears the cylinder's database for reprogramming.

Figure 14:
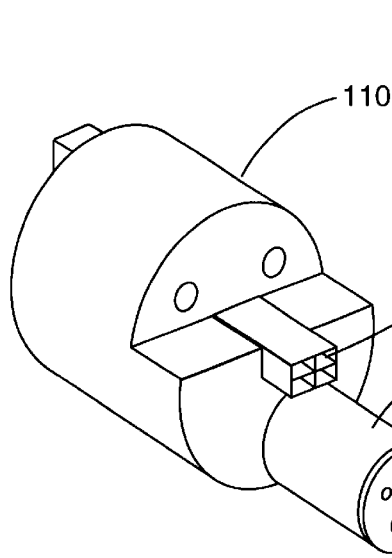
FIGS. 14–14C are perspective and elevational sectional views showing a mortise cylinder and a cylinder cover for a specific embodiment of the invention.
Figure 14A:
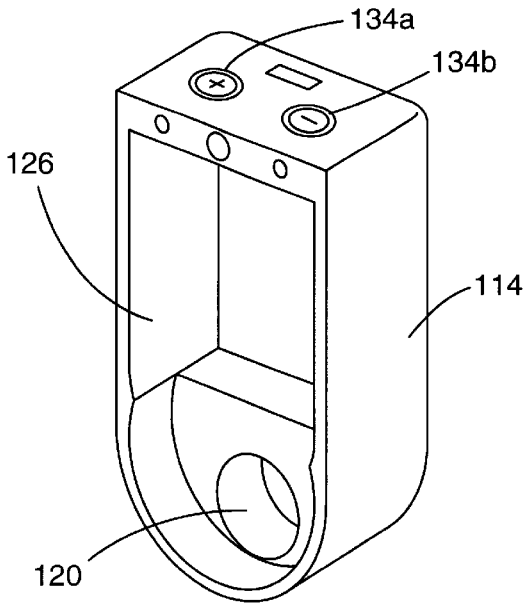
Figure 14B:
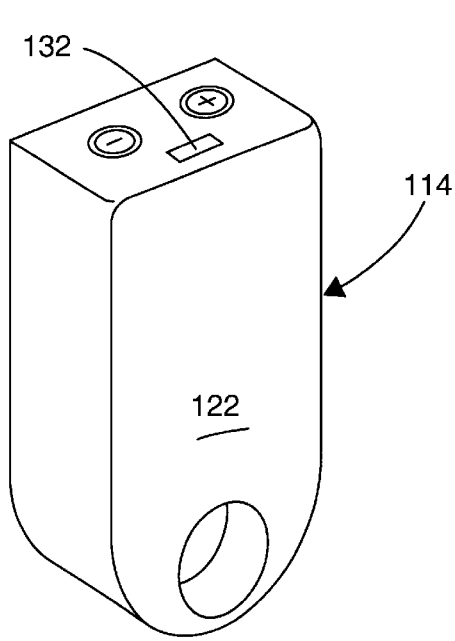
Figure 14C:
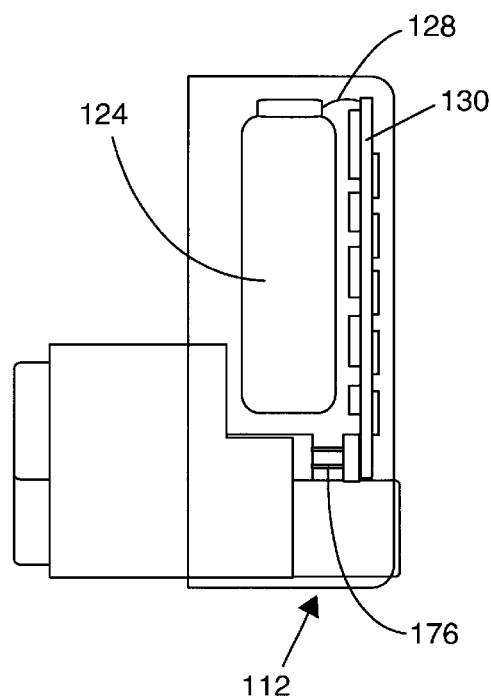

FIGS. 14–14C show a mortise type cylinder in accordance with another embodiment of the invention. The mortise cylinder 110 forms a part of a cylinder unit 112 that includes the cylinder and a cylinder cover unit 114. In this embodiment the cylinder 110 is especially shaped to mate with the cylinder cover unit 114, such that a forward projection 116 of the cylinder, containing the plug 118, inserts into and through a cavity 120 in the cover unit so as to bring the face of the plug 118 flush with the front surface 122 of the cover unit when the two are secured together.

As shown in the side sectional view of FIG. 14C, the cover unit 114 includes a battery, which may be a standard 9 volt battery 124 as shown, positioned in a large cavity 126 as seen in FIG. 14A. The battery 114 is connected by conductors 128 to a circuit board 130 having various components as described above, including a microprocessor, EEPROM, LED visible from the exterior of the unit (as from opening 132, and other features described above).

At the top of the cylinder cover unit 114 is preferably included a pair of electrical contacts 134a and 134b for receiving auxilliary power in the event the battery 124 goes too low. The contacts 134a, 134b preferably are positioned to receive the terminals of a standard 9 volt battery, pushed down against the terminals in the orientations noted, for convenience in providing such auxilliary power.

The cylinder and cover unit 112 of FIGS. 14 to 14C operates as an access control device preferably with mechanical features, as described above in connection with other embodiments.

Figure 15A:
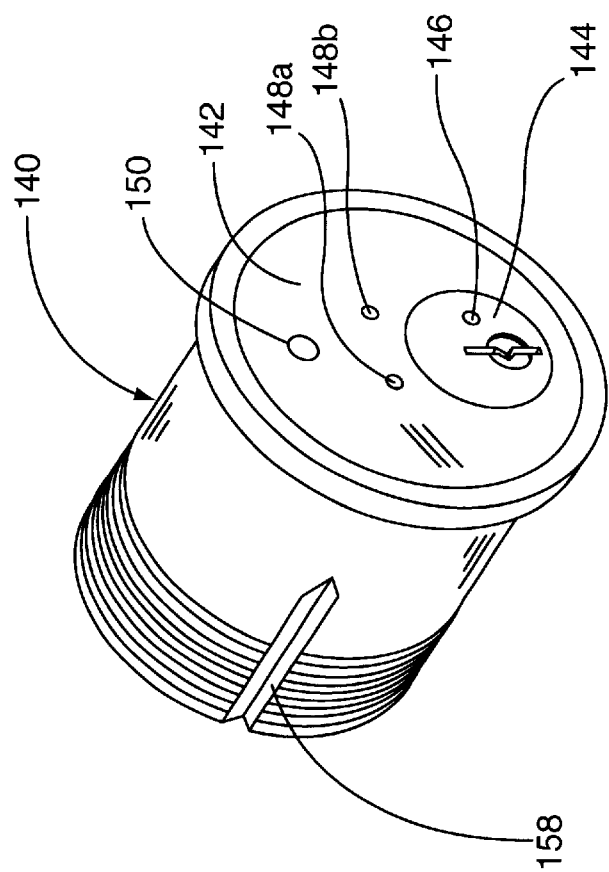
FIGS. 15 and 15A are perspective views showing an inside battery and circuity-containing unit and an outside electromechanical cylinder which mate together electrically when installed in a door in accordance with another embodiment of the invention.
Figure 15:
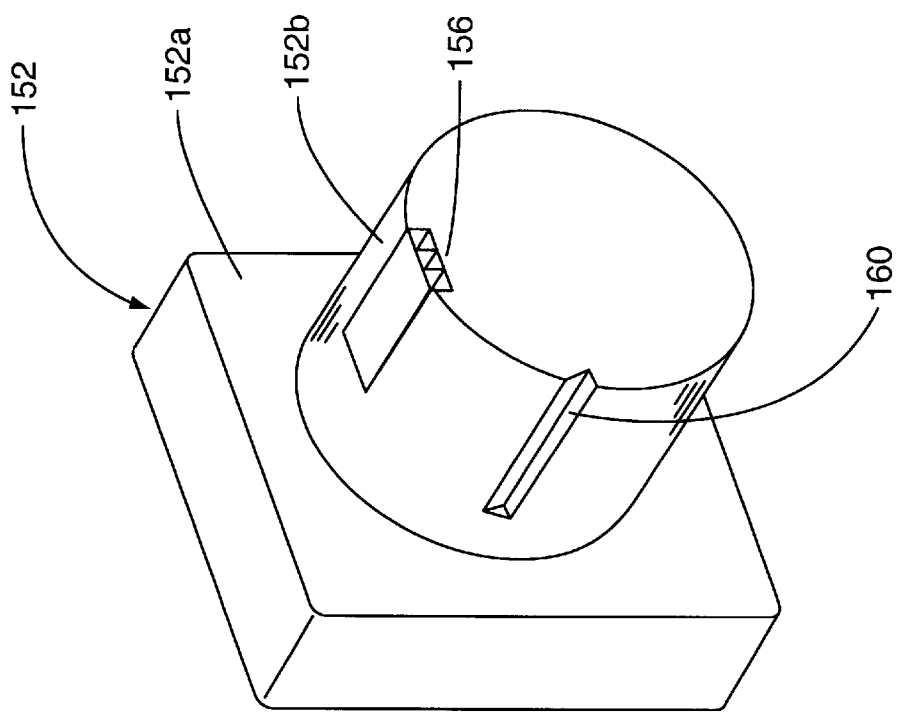

FIGS. 15 and 15A show another form of an electromechanical mortise cylinder 140. As shown the face 142 of the cylinder 140 has a cylinder plug 144 with a contact 146 for one-wire bus connection. In addition, the face of the cylinder includes auxilliary power contacts 148a and 148b for jumping the cylinder with auxilliary power when needed. An LED 150 for status (access granted or denied) may also be included, as above.

Figures 15B, 15C:
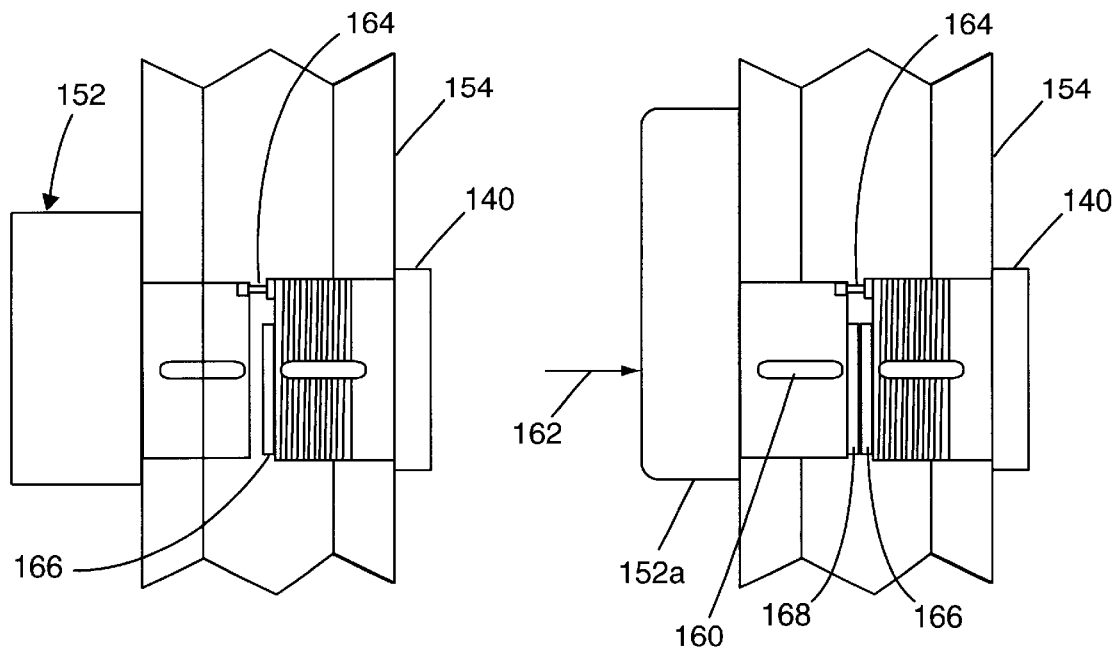
FIG. 15B is an elevation view in section showing the components of FIGS. 15 and 15A as installed in a door.
FIG. 15C is a similar view showing a modified unit installed in a door, one which has a double cylinder arrangement.
Figure 15D:
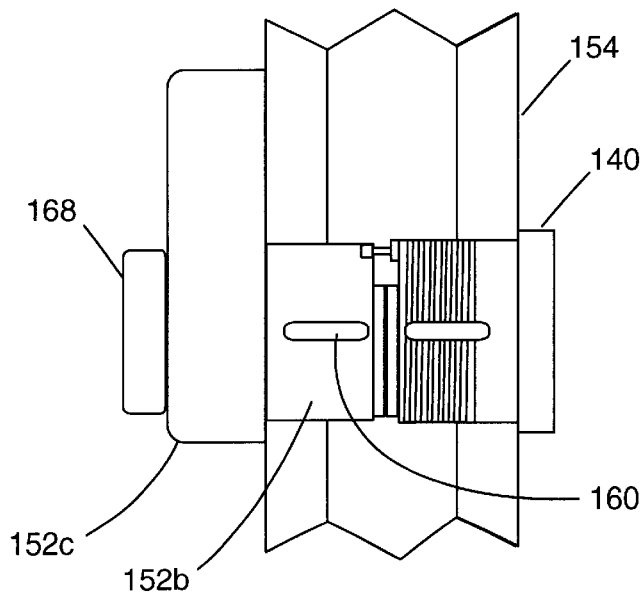
FIG. 15D is another similar view, but showing a thumb-latch unit on the inside component.

FIG. 15 shows a power and circuitry unit 152 which is to be installed in the position of a back cylinder opposite the cylinder 140. The installed position in a door 154 is shown in FIG. 15B. In this unit 152, a battery and circuitry are contained in the inside component 152, either in a portion 152a which preferably mounts on the inside surface of the door, or in a cylinder-shaped projection or extension 152b which is sized to fit within an existing hole in a mortise lock set (lock set not specifically shown). Although such a lock set typically is provided with internal threads in the metal of the lock set, for receiving either a second cylinder similar to the cylinder 140 or receiving a thumb turn unit in the same position, the diameter of the extension 152b is slightly smaller so as to slide closely inside such internal threads, without being engaged with the threads (threads not shown). The extension 152b has at its back side a multiposition electric connector 156, (FIG. 15) positioned to engage with pins or other connections in the cylinder 140. FIGS. 15 to 15D also show grooves 158 in the cylinder 140 and 160 in the back unit extension 152b, for being engaged by set screws once the components are installed in a door. This is in accordance with a typical installation of a mortise cylinder which this embodiment would replace.

FIG. 15B shows the installation of the cylinder 140 and back unit 152 in a door 154, with FIGS. 15C and 15D showing modifications of the back unit.

FIG. 15C shows a similar electromechanical lock cylinder 140 in the door 154, but with a different back unit 152a. The unit 152a provides a double cylinder lock arrangement, with a key receivable in a keyway as indicated by the arrow 162, indicating entry of a key. As described above, the access control features of the cylinder and back unit 140, 152a are similar to other embodiments, and particularly similar to the embodiment of FIG. 15B, the difference being that the unit 152a has a cylinder for providing a double cylinder arrangement along with the cylinder 140, both of which preferably (but not necessarily) having the electronic access control features.

FIGS. 15B to 15D also show electrical connectors 164 which extend between the back of the cylinder 140 and the back of the power circuitry unit 152. Such connectors preferably are multi-position connectors and can include a receiving socket on one side (either on the component 140 or the component 152), with semi-rigid pins extending from the other component. Assembly of the unit 152 (or 152a) preferably is by sliding the unit straight into the door, in the proper orientation, which will align and assure proper connection of the pins and connectors. As an alternative, the connection can be made by a wire or ribbon type flexible cable connector, with connection made prior to insertion of the back unit 152, 152a and with the excess ribbon then extending up away from the cylinders.

The location of the connectors 164 is important, as it must avoid interference with the movable cam 166 on the back side of cylinder 140, or with two back-to-back cams 166, 168 in the case of FIG. 15C. The cams normally rotate within an arc which only occupies approximately the lower two-thirds or three-fourths of the height of the cylinder, and the connectors can be positioned near the top of the cylinders. These connectors can be positioned in recesses in the back of the cylinder, or flats or recesses can be formed in the top edge of the threaded cylinder to provide space for the connector assembly to be installed. The connectors can be located similarly on the back unit 152, 152a.

FIG. 15D shows a similar arrangement wherein the electromechanical cylinder 140 is backed up by a back unit 152c having a thumb turn 168. Otherwise, the function of this assembly is similar to that of FIGS. 15B and 15C.

Figure 16:
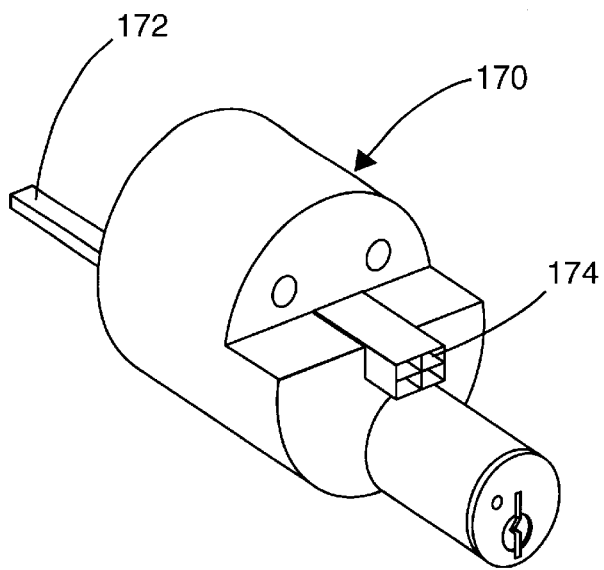
FIGS. 16–16C are similar to FIGS. 14–14C, showing a tail piece on a rim cylinder, rather than the mortise cylinder of FIG. 14.
Figure 16A:
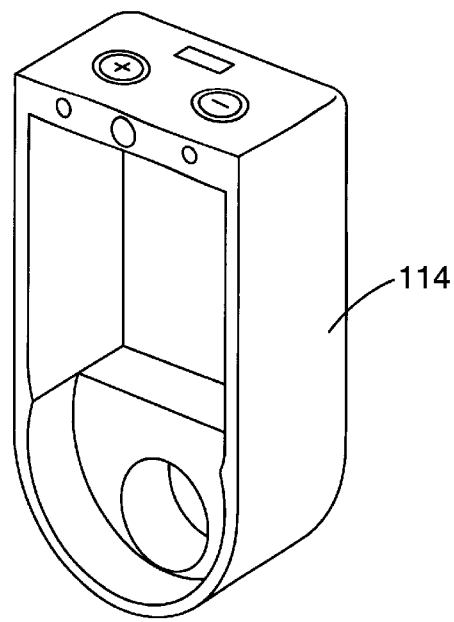
Figure 16B:
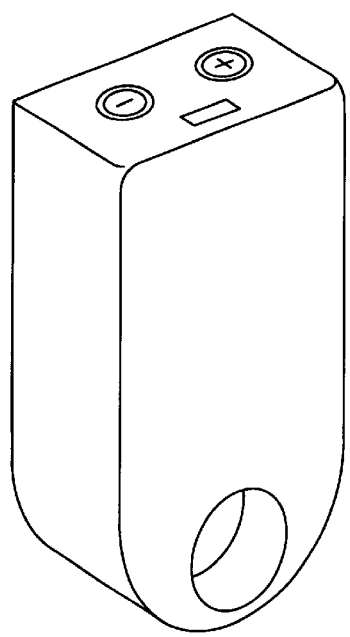
Figure 16C:
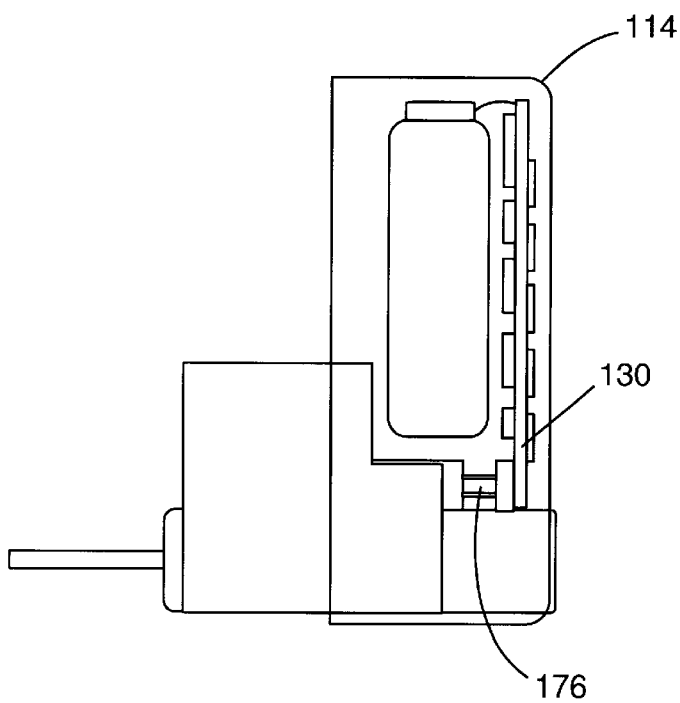

FIGS. 16–16C show another embodiment which is very similar to that of FIGS. 14–14C, except that the cylinder 170 is a rim type cylinder, with a tail piece 172, and without threads on the cylinder body, which is installed by axially sliding it into place. The modifications at the front end of the cylinder 170 are similar to those described above in FIG. 14, and the cylinder cover unit 114 can be identical to that described above. As in that embodiment, multiposition connectors 174 on the cylinder 170 are positioned to engage with connectors 176 on the circuit board 130 in the cylinder cover unit 114.

Figure 17:
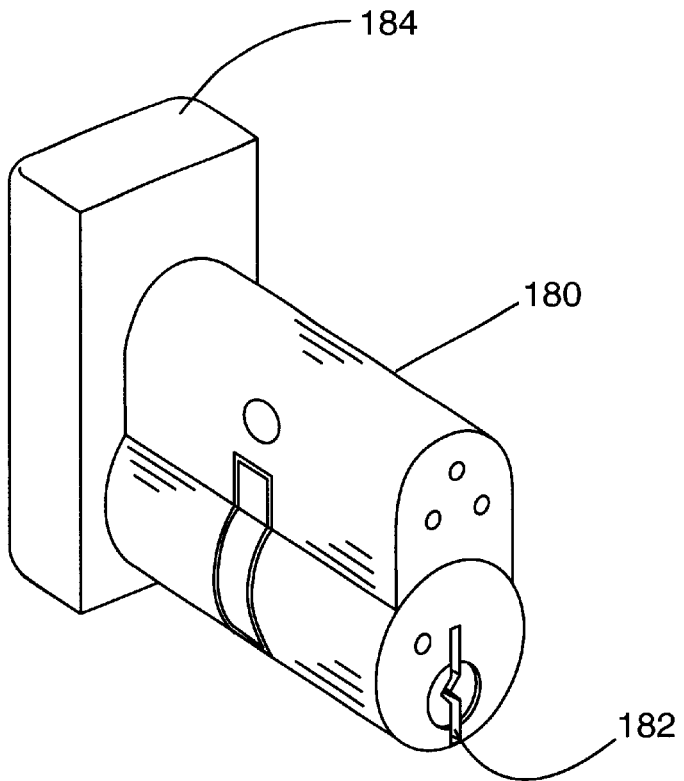
FIGS. 17 and 17A are perspective and side elevation views showing European profile cylinder having a front portion with battery and circuity in accordance with the invention.
Figure 17A:
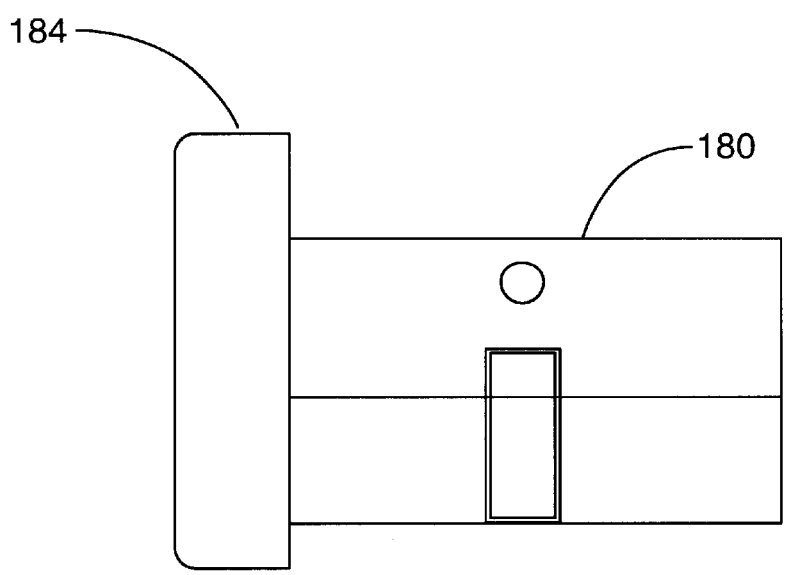
Figure 17B:
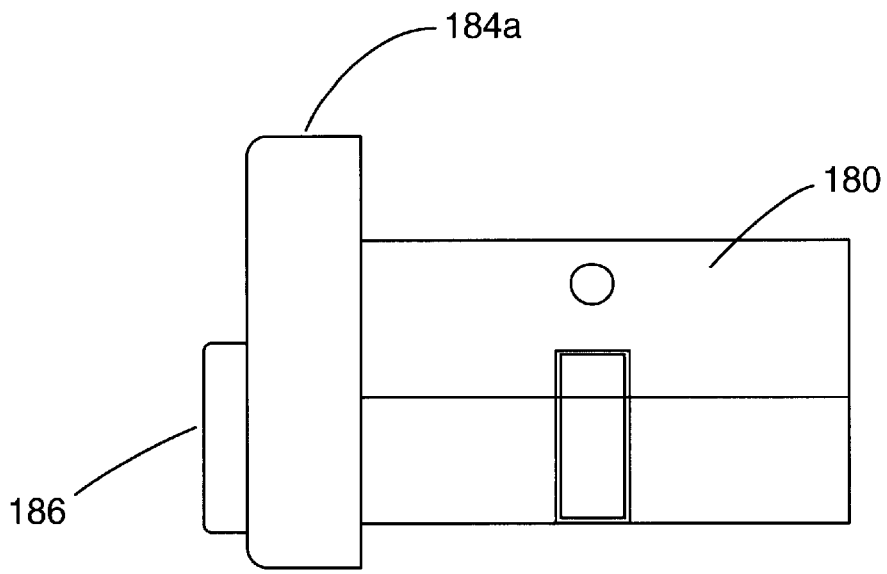
FIGS. 17B and 17C are side elevation views, again showing the European profile type cylinder, and indicating one side with a thumb turn in FIG. 17B and a double cylinder in FIG. 17C.
Figure 17C:
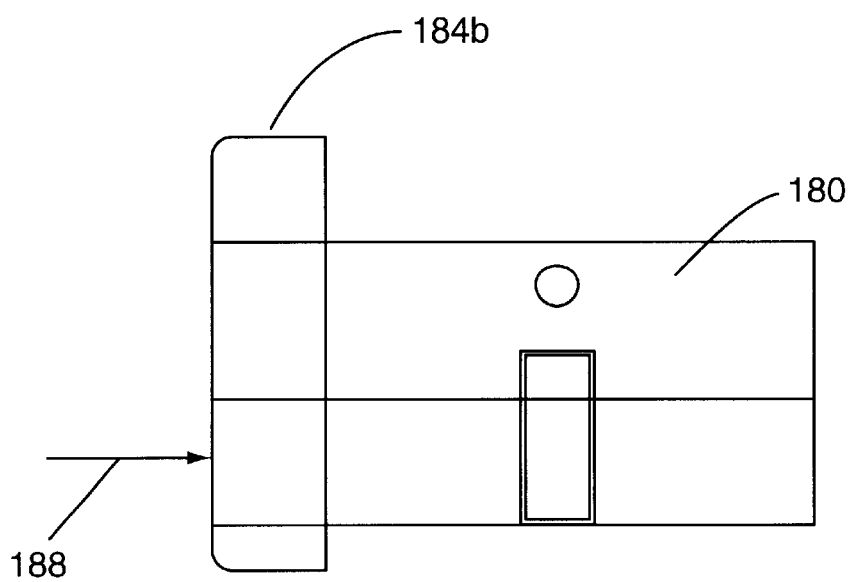
Figure 17D:
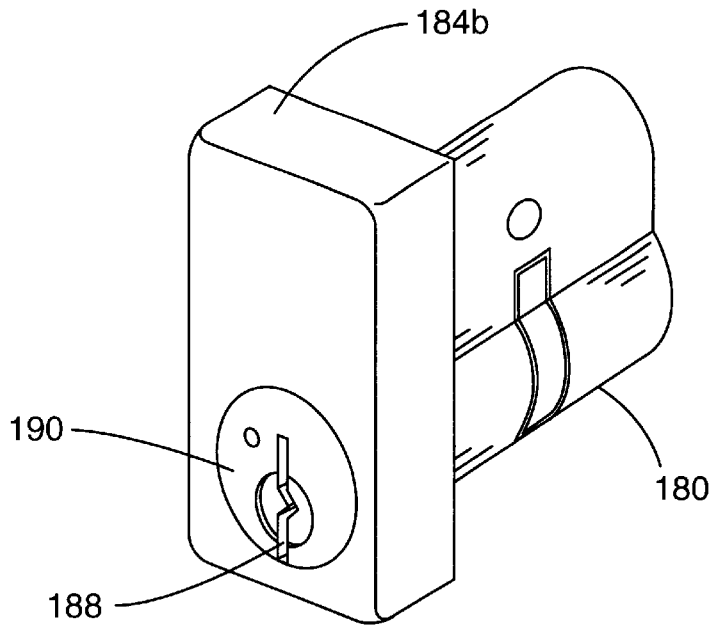
FIGS. 17D and 17E are perspective views showing the European profile type cylinders of FIGS. 17B and 17C.
Figure 17E:
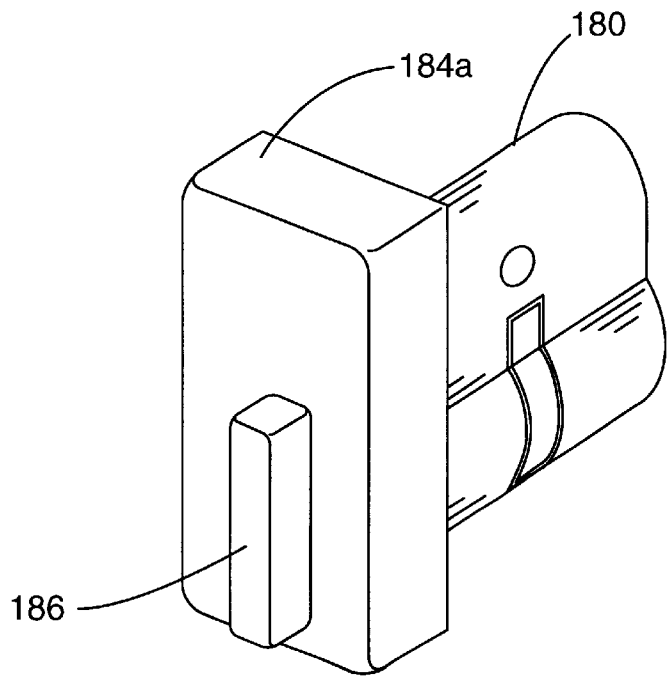

FIGS. 17–17E show a European profile type cylinder to which is applied the principles of the invention. The profile cylinder 180 shown in FIG. 17 is a single-cylinder embodiment, with the mechanical key to enter a keyway 182 at the front of the cylinder. Again, a back unit 184 is included, to house a battery and electronics. In this form of the invention the back unit and the cylinder 180 preferably are formed as a single unit, although they could be attached by secure fasteners if desired. The unit 180, 184 is similar in function to the embodiment of FIG. 15B; the cylinder is operable from the outside, as at the keyway 182, but not from the inside of the door. FIG. 17A shows a side view of the same embodiment.

FIG. 17B shows a European profile cylinder employing the principles of the invention, analogous to the embodiment shown in FIG. 15D. A thumb turn 186 is provided for the inside of the door, with the back unit 184a (containing a battery and electronics) positioned to be pressed against the inside surface of the door. FIG. 17C shows an embodiment wherein the back unit 184b is analogous in function to the unit shown in FIG. 17C. In other words, a key, which may be a mechanical key, enters as indicated at the arrow 188. Thus, the unit shown in FIG. 17C is keyed from both sides, and as noted above, one can be electrical/mechanical while the other is merely mechanical, or is merely electronic, or vice versa.

FIGS. 17D and 17E are perspective views showing the units of FIGS. 17C and 17B, respectively, from the position of the inside of the door. The cylinder plug 190 of the double-keyed unit 184b of FIG. 17C is shown in FIG. 17D, with the keyway 188 visible in the plug. FIG. 17E shows the thumb turn 186 of the back unit 184a.

Figure 18:
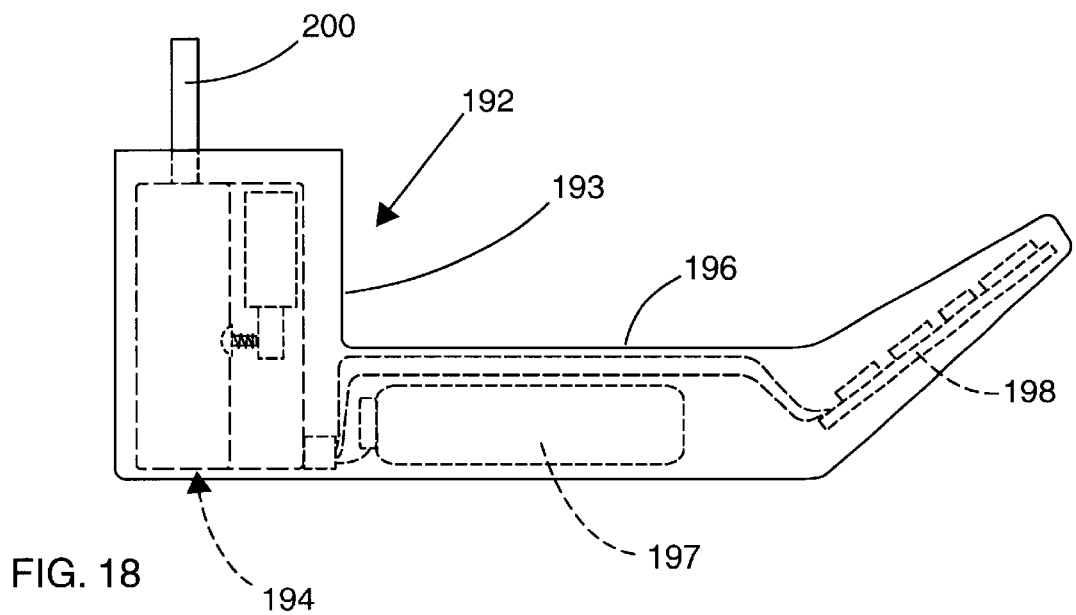
FIGS. 18, 18A and 18B show a self-contained lever handle for replacing a mechanical-only lever handle, the lever handle of the invention including battery and circuity in combination with a electromechanical cylinder.
Figure 18A:
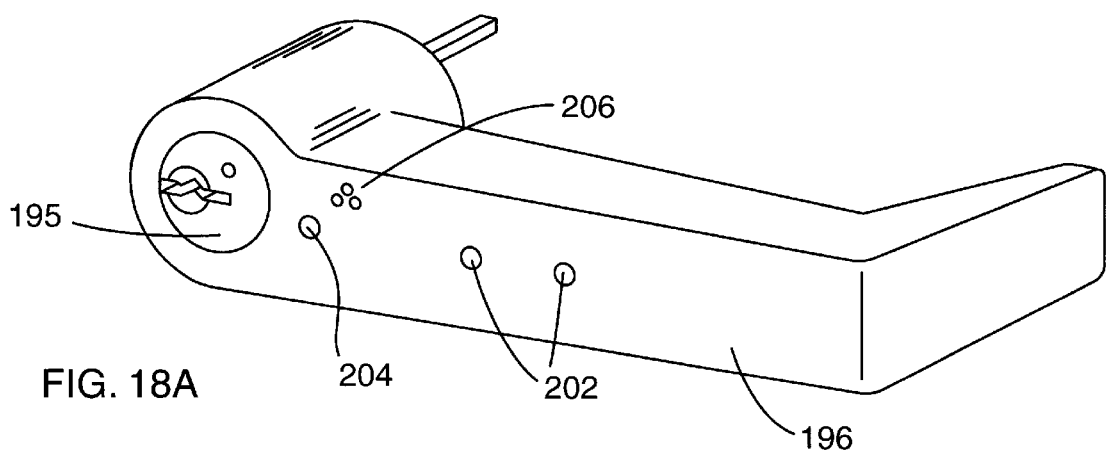
Figure 18B:
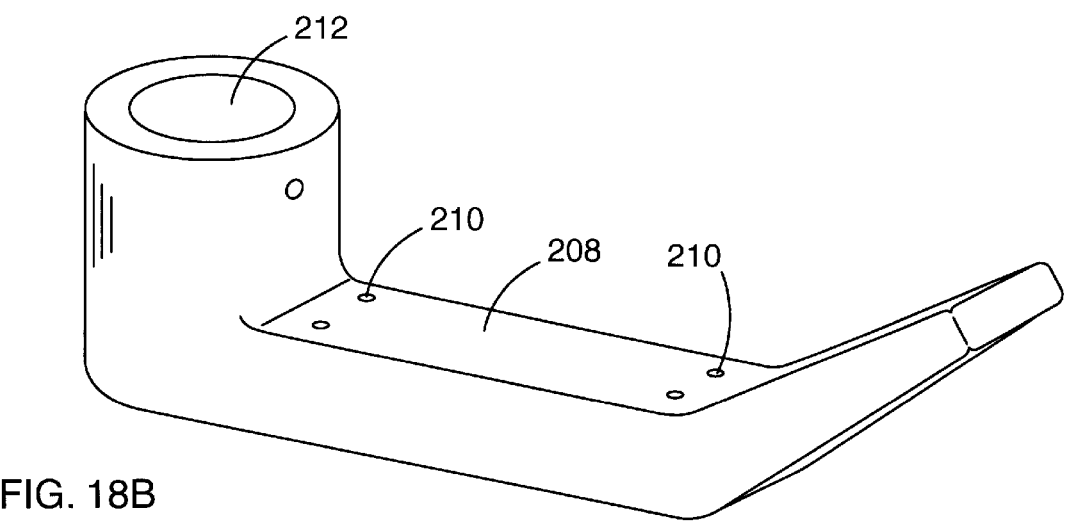

FIGS. 18, 18A and 18B show a self-contained lever handle 192 according to another embodiment of the invention. As noted above, the lever handle 192 is designed to replace a standard lever handle, which may have a lock cylinder. The unit 192 has a lock cylinder 194 in a hub or base portion 193, with exposed cylinder plug 195. The handle has a grip portion 196 which is hollow in parts and large enough to contain a battery 197. A circuit board is shown at 198, with electronics being connected into the cylinder 194 to perform the same functions as described above. A rotatable tail piece 200 extends into the lock mechanism within the door.

FIG. 18A shows that the grip portion 196 of the lever handle has contacts 202 for receiving auxilliary external power when needed, analogous to the contacts shown in other embodiments. In addition, the face of the handle may include an LED 204 which shows appropriate color for status as to access granted or not, and may include a sound emitter 206 to indicate status audibly. FIG. 18B shows on the back side of the lever handle a cover plate 208, which may be accessible by fasteners 210, for servicing the electronics and replacing the battery 197. In FIG. 18B the cylinder is removed, revealing a cylinder cavity 212.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A cylinder collar for use with a lock cylinder having electronic access control means, such cylinder having components requiring power, said cylinder collar comprising:
    (a) a collar body having a recessed hole capable of seating a head of the cylinder and when installed on an outer side of a door along with a cylinder, the collar body surrounding a portion of the cylinder,
    (b) at least one cavity in the collar body capable of storing a battery, and
    (c) battery contact means for providing connection between a battery in said cavity and the cylinder when the collar is installed on a lock with a cylinder.

2. The cylinder collar of claim 1, including a nine volt battery within the cavity of the collar.

3. The cylinder collar of claim 1, further including a pair of external contacts on the collar for enabling the powering of the lock cylinder with external power in the event of battery failure.

4. The cylinder collar of claim 1, in combination with a lock position, the lock cylinder having a cylinder plug and a narrow, cylindrical shell extension of the cylinder, covering most of the length of and being concentric with the cylinder plug, and the recessed hole of the collar body being sized to receive the cylinder plug and cylindrical cylinder extension, such that the cylinder plug is exposed at the front of the collar body.

5. The cylinder collar of claim 1, in combination with said lock cylinder, having electronic access control means, the lock cylinder including a blocking means for preventing rotation of a cylinder plug of the cylinder, except when required electronic access control data is input to the cylinder.

6. The cylinder and collar combination of claim 5, wherein the lock cylinder comprises a rim cylinder.

7. The cylinder and collar combination of claim 5, wherein the lock cylinder comprises a mortise cylinder.

8. The cylinder collar of claim 1, wherein the battery contact means comprises a pin and socket connection that engages when the collar body is put together with said lock cylinder.

9. A lock cylinder arrangement with electronic access control, comprising:
    a European type lock cylinder installed into a lock unit which is fitted into a cavity in a door, and the cylinder having electronic access control components requiring power, and the cylinder having a rotatable plug attached to a movable piece that interacts with a latch or deadbolt of the lock unit when a key is inserted into the cylinder and the plug is rotated,
    the cavity in the door extending through the door, and the lock cylinder having a body portion with a length substantially as long as the thickness of the door, such that the lock cylinder can be installed from the inside door face,
    a back unit attached to a back side of the lock cylinder, and back unit being larger in width than the body portion and including a battery casing containing at least one battery, the back unit being mounted at the inside of the door and having a flat surface engaged against the inside door face and covering the cavity at the inside door face, with the cylinder extending through the cavity, and
    a power connection from the battery of the back unit into the lock cylinder for said components requiring power.

10. The apparatus of claim 9, wherein the European type lock cylinder is a double cylinder, keyed at the inside of the door as well as the outside, the cylinder extending into the back unit so as to expose the key slot at the inside of the door, surrounded by the back unit.

11. The apparatus of claim 9, wherein the back unit has a thumb turn connected to unlock the door from the inside.

12. A lock cylinder arrangement with electronic access control, comprising:
    lock cylinder installed into a lock unit which is fitted into a cavity in a door, and the cylinder having electronic access control components requiring power, and the cylinder having a rotatable plug attached to a movable rear piece that interacts with a latch or deadbolt of the lock unit when a key is inserted into the cylinder and the plug is rotated,
    the lock unit having a rear hole positioned toward the inside of the door and directly opposite the position of the lock cylinder,
    the door having an inside door face with an opening directly adjacent to the rear hole in the lock unit, for access thereto from the inside of the door,
    a back unit including a battery casing containing at least one battery, the back unit being mounted at the inside of the door and covering the opening in the inside door face, the back unit having an extension which fits into the rear hole of the lock unit by sliding insertion therein, and
    electrical connectors between the extension of the back unit, at the inner end of the back unit, and the back side of the lock cylinder, effective to connect power into the lock cylinder for said components requiring power, when the battery casing is inserted into the lock unit.

13. The apparatus of claim 12, wherein the electrical connectors comprise wires between the extension of the back unit and the back side of the lock cylinder.

14. The apparatus of claim 12, wherein the electrical connectors comprise spring contacts between the extension of the back unit and the back side of the lock cylinder.

15. The apparatus of claim 12, wherein the electrical connectors comprise pin and socket connectors.

16. The apparatus of claim 12, wherein the back unit includes a manual knob accessible from the inside of the door and with a linkage arranged to engage with the lock unit so as to retract the latch or deadbolt by turning up the manual knob.

17. The apparatus of claim 12, wherein the back unit includes an additional lock cylinder, so that the lock unit in the door is accessible by a key both inside and outside.

18. A self-contained lever handle capable of fitting into and operating a key-in-knob type cylindrical lever lock set in a door, the lever having electronic access control, comprising:

the handle containing a battery and circuitry containing logic for making access control decisions, an access panel in the handle capable of removal to obtain access to and change the battery, and the handle having a base portion containing a lock cylinder, the lock cylinder having electronic access control features and components requiring power and being connected to the battery and to the circuitry containing logic, said electronic access control features including an isolation contact on the lock cylinder positioned to electronically read a key when inserted into a key slot of the lock cylinder, and the circuitry containing logic being capable of reading an identification code on the key and making an access control decision based on such identification.

19. The apparatus of claim 18, wherein the lever handle has an outer surface with a pair of auxiliary external power contacts for receiving external power to allow accessing of the electronic access features of the lock in the event the battery in the handle is too low, said access panel being located at an inside surface of the lever handle.

20. The apparatus of claim 18, wherein the lever handle has an outer surface with a light emitting diode connected to the electronic access control components in the lock and capable of indicating status after an attempt at access has been made, as to whether access is granted or not.

21. A self-contained locking knob capable of fitting into and operating a key-in-knob type cylindrical lock set in a door, the knob having electronic access control, comprising:

the knob containing a battery and circuitry containing logic for making access control decisions, an access panel in the knob capable of removal to obtain access to and change the battery, and the knob containing a lock cylinder, the lock cylinder having electronic access control features and components requiring power and being connected to the battery and to the circuitry containing logic, said electronic access control features including an isolation contact on the lock cylinder positioned to electronically read a key when inserted into a key slot of the lock cylinder, and the circuitry containing logic being capable of reading an identification code on the key and making an access control decision based on such identification.

22. In a system of locks and keys having electronic access control features wherein certain keys are to be permitted access to certain locks as selected, a management system for setup, monitoring and control of which keys can access which locks, comprising:

a computer with a memory and a monitor, the computer having programming, a series of keys, each having an electronic ID with means for reading the ID, a series of locks, each having electronic access control features, including an electrically operated blocking member, a microcontroller for making access control decisions, and connected memory, each lock being programmable for access by selected ones of the keys according to key ID's, and means in the computer programming for (a) presenting on the monitor a matrix representing locks in the system on one axis of the matrix and keys of the system on the other axis of the matrix, (b) facilitating user selection of which key or keys in the system are to be permitted electronic access to which lock or locks in the system, by the user's making a positive indication on the matrix by use of a user input device, such that each location of a positive indication comprises an intersection of a row and column represented by a particular lock and key signifying that the key is to have access to that lock, and including provision for some keys having access to multiple locks and for some locks being accessible by multiple keys, as desired, (c) recording the user selections in computer memory, along with codes or ID numbers representing the locks and keys, and (d) for generating programming data in accordance with the user's selections, for the locks in the systems, as to which locks are to be accessible by which keys.

23. The system of claim 22, wherein the computer programming includes mean for inputting into the computer and memory information identifying the ID on each key of the system, so that the ID on each key of the system, so that the ID is associated in the computer with each of the series of keys in the system as listed on the matrix, and further including lock programming means for programming locks of the system with access control information as to which keys of the system are to be permitted access to which locks, in accordance with the selections made by the user of the matrix presented by the computer programming.

24. The apparatus of claim 22, wherein the lock programming means comprises:

a programming key for the system, having a key blade and having a programmable memory, the programming key being portable and insertable into the locks of the system, and the programming key including means for connecting to the computer when desired, and for downloading stored information from the computer into the programming key memory, the computer and programming having means for downloading data representing the recorded user selections of which locks are to be accessed by which keys, to the programming key memory when the programming key is connected to the computer, such that the programming key stores, for each lock in the system, which keys in the system should be capable of electronically accessing the lock, and means on the programming key for making electrical contact with locks in the system when the programming key is inserted into a lock, enabling data transfer between the programming key and the microcontroller of the lock so as to program the locks to grant electronic access to those keys selected by the user.

25. The system of claim 22, wherein at least some of the locks and some of the keys include mechanical bitting configurations, with specific keys having bittings matched to specific locks.

26. The system of claim 22, wherein the computer programming includes means enabling user input of data relating to mechanical bitting matches between keys and locks, and further includes means preventing selection of keys to electronically access locks in cases where a mechanical hitting match does not exist.

* * * * *